US012776433B2

(12) United States Patent
Zehani et al.

(10) Patent No.: US 12,776,433 B2
(45) Date of Patent: Oct. 27, 2026

(54) PROCESS FOR PRODUCING MAGNETIC NANOCOMPOSITES AND MAGNETIC NANOCOMPOSITES THEREOF

(71) Applicants: Université Paris Est Créteil Val de Marne, Créteil (FR); Centre National de la Recherche Scientifique, Paris (FR)

(72) Inventors: Karim Zehani, Cachan (FR); Jacques Moscovici, Le Raincy (FR); Lotfi Bessais, Thiais (FR)

(73) Assignees: UNIVERSITÉ PARIS EST CRÉTEIL VAL DE MARNE, Créteil (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 1363 days.

(21) Appl. No.: 17/518,635

(22) Filed: Nov. 4, 2021

(65) Prior Publication Data

US 2022/0139600 A1 May 5, 2022

(30) Foreign Application Priority Data

Nov. 4, 2020 (FR) ....................................... 2011340

(51) Int. Cl.

| | |
|---|---|
| ***H01F 1/34*** | (2006.01) |
| ***C01G 51/82*** | (2025.01) |
| ***H01F 1/00*** | (2006.01) |
| ***H01F 1/047*** | (2006.01) |
| ***H01F 1/11*** | (2006.01) |
| ***H01F 1/36*** | (2006.01) |
| ***H01F 1/44*** | (2006.01) |
| ***H01F 10/16*** | (2006.01) |
| ***H01F 41/00*** | (2006.01) |

(52) U.S. Cl.

CPC ............. *H01F 1/047* (2013.01); *C01G 51/82* (2025.01); *H01F 1/0054* (2013.01); *H01F 1/11* (2013.01); *H01F 1/447* (2013.01); *H01F 41/00* (2013.01); *C01P 2002/32* (2013.01); *C01P 2006/42* (2013.01)

(58) Field of Classification Search

CPC ... H01F 1/11; H01F 1/34; H01F 1/342; H01F 1/344; H01F 1/348; H01F 1/36; H01F 1/346; H01F 1/0054; H01F 10/16; C01G 51/82; C01P 2002/32; C01P 2006/42

See application file for complete search history.

(56) References Cited

FOREIGN PATENT DOCUMENTS

JP 2011214026 A * 10/2011

OTHER PUBLICATIONS

Machine translation of JP-2011214026-A, 11 pages. (Year: 2011).*

Shirsath et al.,"Chemical tuning of structure formation and combustion process in CoDy0.1Fe1.904 nanoparticles: influence@pH" , J. Nanopart. Res 15:1976, 13 pages. (Year: 2013).*

Jia et al., "Monodispersed Co, Ni-Ferrite Nanoparticles with Tunable Sizes: Controlled Synthesis, Magnetic Properties, and Surface Modification", J. Phys. Chem. C 112, pp. 911-917. (Year: 2008).*

Search report issued in corresponding French application No. FR2011340 dated Jul. 15, 2021, 7 pages.

Jovanovic, et al. "pH control of magnetic properties in precipitation-hydrothermal-derived CoFe2O4." Journal of Alloys and Compounds. vol. 589. Dec. 4, 2013. pp. 271-277.

Hussain, et al. "Dielectric and magnetic properties of cobalt doped-FeOnanoparticles. Journal of Materials Science: Materials in Electronics." vol. 30, No. 14. Jun. 26, 2019. pp. 13698-13707.

Briceño, et al. "Solvothermal synthesis of cobalt ferrite hollow spheres with chitosan." Materials Science and Engineering C 78. Apr. 27, 2017. pp. 842-846.

Reddy, et al. "A facile hydrothermal synthesis, characterization and magnetic properties of mesoporous CoFe2O4 nanospheres." Journal of Magnetism and Magnetic Materials. vol. 388. Apr. 7, 2015. pp. 40-44.

Wu, et al. "Solvothermal synthesis of cobalt ferrite nanoparticles loaded on multiwalled carbon nanotubes for magnetic resonance imaging and drug delivery." Acta Biomaterialia. vol. 7. May 30, 2011. pp. 3496-3504.

* cited by examiner

*Primary Examiner* — Matthew E. Hoban
*Assistant Examiner* — Lynne Edmondson
(74) *Attorney, Agent, or Firm* — Colson Law Group, PLLC

(57) ABSTRACT

The invention relates to a method for producing iron oxide-based composite magnetic nanocomposites, for modulating the magnet grade of the magnetic nanocomposites to, for example, a soft magnetic material, or a semi-hard magnetic material, or a hard magnetic material, comprising the following steps:

a0) separate dissolutions of precursors and of a base a) introduction at room temperature of an iron-based precursor (F) and of at least one metal precursor (M) other than an iron-based precursor, and of at least one base (B), and optionally of at least one rare earth precursor (R), in a given order of introduction into the autoclave b) hydrothermal and/or solvothermal production, so as to obtain magnetic nanocomposites which have a main phase and one or more secondary phases $M'_2(OH)_2O_2$ and/or $R(OH)_3$, c) a step of washing the nanocomposites.

20 Claims, 13 Drawing Sheets

PROCESS FOR PRODUCING MAGNETIC NANOCOMPOSITES AND MAGNETIC NANOCOMPOSITES THEREOF

TECHNICAL AREA

The present invention relates to a method for producing iron oxide-based magnetic nanocomposites, as well as the nanocomposites resulting from this method, and a composition comprising said magnetic nanocomposites, as well as their applications.

PRIOR ART

Nanotechnology has been expanding dramatically over the last twenty years, nanoparticles in general are the basis of this new technology and have multiple applications in several fields such as health, electronics, environment, transportation, and consumer and healthcare products. Magnetic nanoparticles in particular are increasingly used to improve therapeutic protocols or diagnostic methods, but also for several other applications such as catalysis, data storage, and energy.

The multiple applications of magnetic nanoparticles depend on their magnet grade (for example soft magnetic material, semi-hard magnetic material, or hard magnetic material). For example, hard magnetic materials can be used as permanent magnets, semi-hard ones for magnetic recording, soft ones for electronic components (for example inductors or transformers), as contrast agents, as tracers, as agents for the treatment of cancer by magnetic hyperthermia or as antibacterial agents. In addition, magnetic nanoparticles can also be used in ferrofluids, magnetorheological fluids, electromagnetic shielding, and in water or soil treatment.

There are a multitude of magnetic nanoparticle production methods that can produce nanoparticles with a given magnetic behavior (for example paramagnetic, ferromagnetic, ferrimagnetic, antiferromagnetic, and superparamagnetic) and a given magnet grade (for example soft magnetic material, semi-hard magnetic material, and hard magnetic material).

For example, in 2011, Wu et al. (*Acta Biomaterialia* 7 (2011) 3496-3504) synthesized cobalt ferrite via the solvothermal route using iron and cobalt chlorides $FeCl_3 \cdot 6H_2O$ at 1.5 mmol and $CoCl_2 \cdot 6H_2O$ at 0.75 mmol as precursors.

In 2012, Ma et al. (*Materials Research Bulletin* 48 (2013) 214-217) synthesized cobalt ferrite via the solvothermal route by placing 0.5 mmol of $Co(NO_3)_2 \cdot 6H_2O$, 1 mmol of $FeCl_2 \cdot 4H_2O$, 0.1 mmol of hexamethylene tetramine (HMTA), 50 mL of glycol, and 20 mL of deionized water in a 100 mL Teflon-lined stainless steel vessel.

In 2015, M. P. Reddy et al. (*Journal of Magnetism and Magnetic Materials* 388 (2015) 40-44) synthesized $CoFe_2O_4$ via the solvothermal route from 2 g of polyethylene glycol (PEG) surfactant in 40 mL of ethylene glycol, 1.5 mmol of cobalt chloride hexahydrate ($CoCl_2 \cdot 6H_2O$), and 3.0 mmol of ferric chloride hexahydrate ($FeCl_3 \cdot 6H_2O$).

In 2017, S. Briceno et al. (*Materials Science and Engineering C* 78 (2017) 842-846) synthesized cobalt ferrites from 1.60 g of $FeCl_3{:}6H_2O$, 0.8 g of $CoNO_3{:}6H_2O$, 2.5 g of chitosan, 3.6 g of NaOAc, 1.0 g of PVP, and 50 mL of ethylene glycol.

In contrast, for a same precursor composition and a given method, there is still no simple and efficient way to modulate the magnet grade (for example soft magnetic material, semi-hard magnetic material, and hard magnetic material) according to the user's needs.

There is therefore a need for a method for producing magnetic nanoparticles that allows the magnetic properties of these magnetic nanoparticles to be easily adjusted according to the intended use.

SUMMARY OF THE INVENTION

The invention aims to overcome these drawbacks. In particular, the object of the invention is a method for producing magnetic nanocomposites that makes it possible to render a same composition of precursors multifunctional for various applications by selecting their magnet grade easily (soft magnetic material, or semi-hard magnetic material, or hard magnetic material). Thus, the magnetic nanocomposites produced can have a given magnet grade: soft magnetic material, or semi-hard magnetic material, hard magnetic material, as needed.

The object of the present invention is a method for iron oxide-based producing magnetic nanoparticles, also called magnetic nanocomposites, comprising the following steps:

a) co-precipitation of an iron-based precursor (F) and of at least one metal precursor (M) other than an iron-based precursor and optionally of at least one rare earth precursor (R) in an autoclave in the presence of at least one base (B);

b) hydrothermal and/or solvothermal production;

characterized in that the compounds from step a) are introduced into the autoclave according to:

one of the following orders: MBF, MFB, FMB, FBM, BMF, or BFM;

where

F is the iron-based precursor,

M is the one or more metal precursors other than an iron-based precursor, and

B is the one or more bases;

or one of the following orders if at least one rare earth precursor is present in step a):

MRFB, MRBF, MFRB, MFBR, MBFR, MBRF, RMFB, RMBF, RFMB, RFBM, RBFM, RBMF, BRFM, BRMF, BFMR, BFRM, BMFR, BMRF, FRBM, FRMB, FMRB, FMBR, FBRM, or FBMR;

where

R is the one or more rare earth precursors.

Advantageously, the invention relates to a method for producing iron oxide-based magnetic nanocomposites, preferably said magnetic nanocomposites having a given magnet grade, the given magnet grade being selected for example from a soft magnetic material, or a semi-hard magnetic material, or a hard magnetic material; said method for producing iron oxide-based magnetic nanoparticles or magnetic nanocomposites comprises the following steps:

a0) separate dissolutions of:

an iron-based precursor F in an aqueous and/or organic solvent in a first container, at least one metal precursor M other than an iron-based precursor in a solvent in a second container, optionally at least one rare earth precursor R, a base B in a solvent in a third container;

a) introduction at room temperature of the dissolved iron-based precursor F and of the at least one metal precursor M other than a dissolved iron-based precursor, of at least one dissolved base B, and optionally of at least one dissolved rare earth precursor R, in a given order of introduction into an autoclave, the combination of these dissolved precursors with the base B resulting in co-precipitation of said precursors, the order of introduction of the dissolved base B into the autoclave in relation to the introductions of the dissolved precursors allowing different precipitates to be obtained, preferably allowing different precipitates to be obtained in variable quantities, the given order of introduction, in step a), of the solutions of step a0) into the autoclave is selected from:

when the dissolved precursors do not include a rare earth precursor, one of the following orders of introduction: MBF, MFB, FMB, FBM, BMF, or BFM, preferably MBF or MFB;

or when at least one dissolved rare earth precursor is generated in step a0), one of the following orders of introduction:

MRFB, MRBF, MFRB, MFBR, MBFR, MBRF, RMFB, RMBF, RFMB, RFBM, RBFM, RBMF, BRFM, BRMF, BFMR, BFRM, BMFR, BMRF, FRBM, FRMB, FMRB, FMBR, FBRM, or FBMR, preferably MRBF, RMFB, FRBM, BFRM, or MBRF, more preferably MRBF or RMFB; with:

F is an iron-based precursor,

M is the one or more metal precursors other than an iron-based precursor, and M is selected from metal chlorides, metal nitrates, metal acetates, metal sulfates, and/or from cobalt-, nickel-, zinc-, and/or copper-based precursors, preferably cobalt-based precursors, more preferably cobalt chloride;

B is the one or more bases;

R is the one or more rare earth precursors b) hydrothermal and/or solvothermal production;

so as to obtain magnetic nanocomposites which have a main phase and one or more secondary phases $M'_2(OH)_2O_2$ and/or $R(OH)_3$, said magnetic nanocomposites having a given magnet grade which is a function of the given order of introduction of the dissolved precursors in relation to the base B in step a), with M'=Fe or M c) a step of washing the magnetic nanocomposites.

Such a method allows magnetic nanocomposites to be produced, the coercive field of which is increased by coupling effect between a main phase (for example a phase comprised of spinel) and one or more secondary phases.

According to other optional features of the method, the latter may optionally include one or more of the following features, alone or in combination:

the method does not include a step of calcining the magnetic nanocomposites. In particular, the method does not include, after the washing step c), a step of calcining the magnetic nanocomposites. This allows the presence of hydroxides and/or oxyhydroxides to be preserved, and thus nanoparticles with a main phase and one or more secondary phases to be produced. This allows multifunctional magnetic nanoparticles to be obtained, as will be described below.

in step a0), the containers are heated to a given temperature below the boiling point of the solvent, and then allowed to cool down to room temperature before step a) is carried out. In particular, to obtain the given magnet grade of the nanocomposites, in step a0) the containers are heated to a given temperature below the boiling temperature of the solvent, and then allowed to cool down to room temperature before step a) is carried out.

the magnetic nanocomposites have from 85% to 97% of a main phase and from 15% to 3% of a secondary phase, respectively. Preferably for the main phase between 87% and 94%, and more preferably between 90% and 93%. Thus, the magnetic nanocomposites may preferably have 6 to 13% of one or more secondary phases and more preferably between 7% and 10%. These percentages are generally mass percentages. In addition, they can be determined, in particular, by Rietveld refinement of X-ray diffractograms.

the main phase being a spinel ferrite of the empirical formula $Co_xNi_yZn_zCu_uMn_vAg_tFe_{2-w}R_wO_4$, with $$x+y+z+u+v+t=1$$

R: La, Ce, Pr, Nd, Pm, Sm, Eu, Gd, Tb, Dy, Ho, Er, Tm, Yb, and Lu w between 0 and 2.

the hydrothermal and/or solvothermal production is carried out at a basicity level between 0 and 100, preferably between 5 and 25, more preferably between 6 and 8, and even more preferably the basicity level is substantially equal to 7, for example it is equal to 7. In particular, the basicity level b corresponds to $$b=\frac{n_B}{\sum n_{M'}}=\frac{[B]}{\sum [M']},$$

b: base and M'=M and R. Such basicity levels allow the morphology of the nanocomposites and the magnet grade of the magnetic nanocomposites to be modulated, where the magnet grade of the magnetic nanocomposites may preferably correspond to: soft magnetic material, or semi-hard magnetic material, or hard magnetic material. In addition, the method may therefore include a step of measuring the basicity level and a step of modifying the basicity level.

the iron-based precursor and/or at least one metal precursor other than the iron-based precursor is/are used in its/their anhydrous form.

the one or more rare earth precursors (R) is/are selected from rare earth chlorides, rare earth nitrates, rare earth acetates, rare earth sulfates, and/or from lanthanum, cerium, praseodymium, neodymium, promethium, samarium, europium, gadolinium, terbium, dysprosium, holmium, erbium, thulium, ytterbium, lutetium, scandium, and yttrium, preferably praseodymium.

different concentrations of the precursors are used in step a0) to modulate the magnet grade of the magnetic nanocomposites, where the magnet grade of the magnetic nanocomposites may preferably correspond to: soft magnetic material, or semi-hard magnetic material, or hard magnetic material.

According to another aspect, the invention also relates to magnetic nanoparticles or magnetic nanocomposites obtained by the method according to the invention or that can be obtained by the method according to the invention. These magnetic nanocomposites comprise a main phase and one or more secondary phases $M'_2(OH)_2O_2$, and/or $R(OH)_3$, which allow the magnet grade of the magnetic nanocomposites to be modulated, where the magnet grade of the magnetic nanocomposites may preferably correspond to: soft magnetic material, or semi-hard magnetic material, or hard magnetic material, with:

$$M'=\text{Fe or } M,$$

M selected from metal chlorides, metal nitrates, metal acetates, metal sulfates, and/or from cobalt-, nickel-, zinc-, and/or copper-based precursors, preferably cobalt-based precursors, more preferably a cobalt chloride;

R: La, Ce, Pr, Nd, Pm, Sm, Eu, Gd, Tb, Dy, Ho, Er, Tm, Yb, and Lu.

According to other optional features of the magnetic nanocomposites, the latter may optionally include one or more of the following features, alone or in combination:

- the magnetic nanocomposites according to the invention have from 85% to 97% of a main phase and from 15% to 3% of a secondary phase, respectively. This allows the magnet grade of the magnetic nanocomposites to be modulated, where the magnet grade of the magnetic nanocomposites may preferably correspond to: soft magnetic material, or semi-hard magnetic material, or hard magnetic material. Preferably for the main phase between 87% and 94%, and more preferably between 90% and 93%. Thus, the magnetic nanocomposites may preferably have 6 to 13% of one or more secondary phases and more preferably between 7% and 10%. These percentages are generally mass percentages. In addition, they can be determined, in particular, by Rietveld refinement of X-ray diffractograms.

The main phase is a spinel ferrite of the empirical formula $Co_xNi_yZn_zCu_uMn_vAg_tFe_{2-w}R_wO_4$ with $$x+y+z+u+v+t=1$$

R: La, Ce, Pr, Nd, Pm, Sm, Eu, Gd, Tb, Dy, Ho, Er, Tm, Yb, and Lu w between 0 and 2.

- the magnetic nanocomposites according to the invention have a coercive field of coercivity between 10 Oe (1 mT) and 20 kOe (2 T), preferably between 0.5 kOe (50 mT) and 10 kOe (1 T), preferably between 5 kOe and 10 kOe.
- the magnetic nanocomposites according to the invention have
  - a coercive field (Hc) greater than 500 mT which corresponds to the following chemical formula: $MFe_{2-x}R_xO_4$ (M: Co and R: Pr; 0≤x≤0.2) and is preferably obtained:
    - at a basicity level, b, of 7
    - at a hydrolysis rate, h, greater than 450
    - without prior heating of the dissolved precursor solutions,
    - with the following order of introduction of the precursors into the autoclave: MRBF (M: Co; B: NaOH; F: Fe; and R: Pr);
  - a coercive field (Hc) greater than 300 mT which corresponds to the following chemical formula: $MFe_{2-x}R_xO_4$ (M: Co and R: Pr; 0≤x≤0.2) and is preferably obtained:
    - at a basicity level equal to 7
    - at a hydrolysis rate, h, greater than 450
    - with prior heating to 70° C. of the dissolved precursor solutions
    - with the following order of introduction of the precursors into the autoclave:
    - MRBF (M: Co; B: NaOH; F: Fe; and R: Pr);
  - a coercive field (Hc) of less than 180 mT which corresponds to the following chemical formula: $MFe_{2-x}R_xO_4$ (M: Co and R: Pr; 0≤x≤0.1) and is preferably obtained:

- at a basicity level equal to 7,
    - at a hydrolysis rate, h, greater than 450,
    - with prior heating, preferably to 70° C., of the dissolved precursor solutions,
    - with the following order of introduction of the precursors into the autoclave:
    - RMBF (M: Co; B: NaOH; F: Fe; and R: Pr);
  - a coercive field (Hc) greater than 550 mT which corresponds to the following chemical formula: $MFe_{1.8}R_{0.2}O_4$ (M: Co and R: Pr) and is preferably obtained:
    - at a basicity level equal to 7,
    - at a hydrolysis rate, h, greater than 450,
    - without prior heating of the dissolved precursor solutions,
    - with the following order of introduction of the precursors: MRBF (M: Co; B: NaOH; F: Fe; and R: Pr);
  - a coercive field (Hc) between 520 and 540 mT ($FeCl_3 \cdot 6H_2O$) or between 560 and 580 mT (anhydrous $FeCl_3$), respectively, which corresponds to the following chemical formula: $MF_{1.85}R_{0.15}O_4$ (M: Co and R: Pr) and is preferably obtained:
    - at a basicity level equal to 7,
    - at a hydrolysis rate, h, greater than 450,
    - using $FeCl_3 \cdot 6H_2O$ or anhydrous $FeCl_3$, respectively,
    - without prior heating of the dissolved precursor solutions,
    - with the following order of introduction of the precursors: MRBF (M: Co; B: NaOH; F: Fe; and R: Pr);
  - a coercive field (Hc) between 660 mT and 680 mT (xPr=0.15) and between 690 mT and 730 mT (xPr=0.30) which corresponds to the following chemical formula: $MFe_{2-x}R_xO_4$ (M: Co and R: Pr; x=0.15; and x=0.30) and is preferably obtained:
    - at a basicity level equal to 7,
    - at a hydrolysis rate, h, greater than 450,
    - with the use of anhydrous $FeCl_3$,
    - with the following order of introduction of the precursors: MRBF (M: Co; B: NaOH; F: Fe; and R: Pr),
    - with prior heating, preferably to 70° C., of the dissolved precursor solutions;
  - a coercive field (Hc) between 520 and 550 mT which corresponds to the following chemical formula: $MFe_{1.85}R_{0.15}O_4$ (M: Co and R: Pr) and is preferably obtained:
    - at a basicity level equal to 7,
    - at a hydrolysis rate, h, greater than 450,
    - with the use of anhydrous $FeCl_3$,
    - without prior heating of the dissolved precursor solutions,
    - with the following order of introduction of the precursors: MRBF (M: Co; B: NaOH; F: Fe; and R: Pr);
  - a coercive field (Hc) between 650 and 680 mT which corresponds to the following chemical formula: $MFe_{1.85}R_{0.15}O_4$ (M: Co and R: Pr) and is preferably obtained:
    - at a basicity level equal to 7,
    - at a hydrolysis rate, h, greater than 450,
    - with the use of anhydrous $FeCl_3$,
    - with prior heating, preferably to 70° C., of the dissolved precursor solutions,
    - with the following order of introduction of the precursors: MRBF (M: Co; B: NaOH; F: Fe; and R: Pr);

a coercive field (Hc) between 55 mT and 65 mT (RFBM), between 150 mT and 170 mT (RMFB), and between 570 mT and 590 mT (MRBF) which corresponds to the following chemical formula: $MFe_{1.975}R_{0.025}O_4$ (M: Co and R: Pr) and is preferably obtained:

at a basicity level equal to 7, at a hydrolysis rate, h, greater than 450, with the following order of introduction of the precursors: RFBM, RMFB, or MRBF (M: Co; B: NaOH; F: Fe; and R: Pr), with prior heating, preferably to 70° C., of the dissolved precursor solutions;

or a coercive field (Hc) between 75 mT and 90 mT (MRBF) and between 640 mT and 660 mT (MRBF) which corresponds to the following chemical formula: $MFe_{1.925}R_{0.075}O_4$ (M: Co and R: Pr) and is preferably obtained:

at a basicity level equal to 7 at a hydrolysis rate, h, greater than 450 with the following orders of introduction of the precursors: MRBF, RMFB, FRBM, BFRM, or MBRF (M: Co; B: NaOH; F: Fe; and R: Pr), with prior heating, preferably to 70° C., of the dissolved precursor solutions.

According to another aspect, the invention relates to a use of the magnetic nanocomposites according to the invention, in a ferrofluid, a magnetorheological fluid, an electromagnetic shielding, and/or for water or soil treatment.

According to another aspect, the invention relates to an assembly comprising composite magnetic nanocomposites according to the invention and:

anti-cancer peptides or antibacterial peptides, at least one drug encapsulated with the nanocomposites in a heat-sensitive material, where the drug may be, for example, a chemotherapeutic agent, and/or a radiosensitizing agent.

BRIEF DESCRIPTION OF THE FIGURES

Other features and advantages of the invention will be better understood upon reading the following description and with reference to the attached drawings, which are illustrative and by no means limiting.

DESCRIPTION OF THE EMBODIMENTS

Figure 1A:
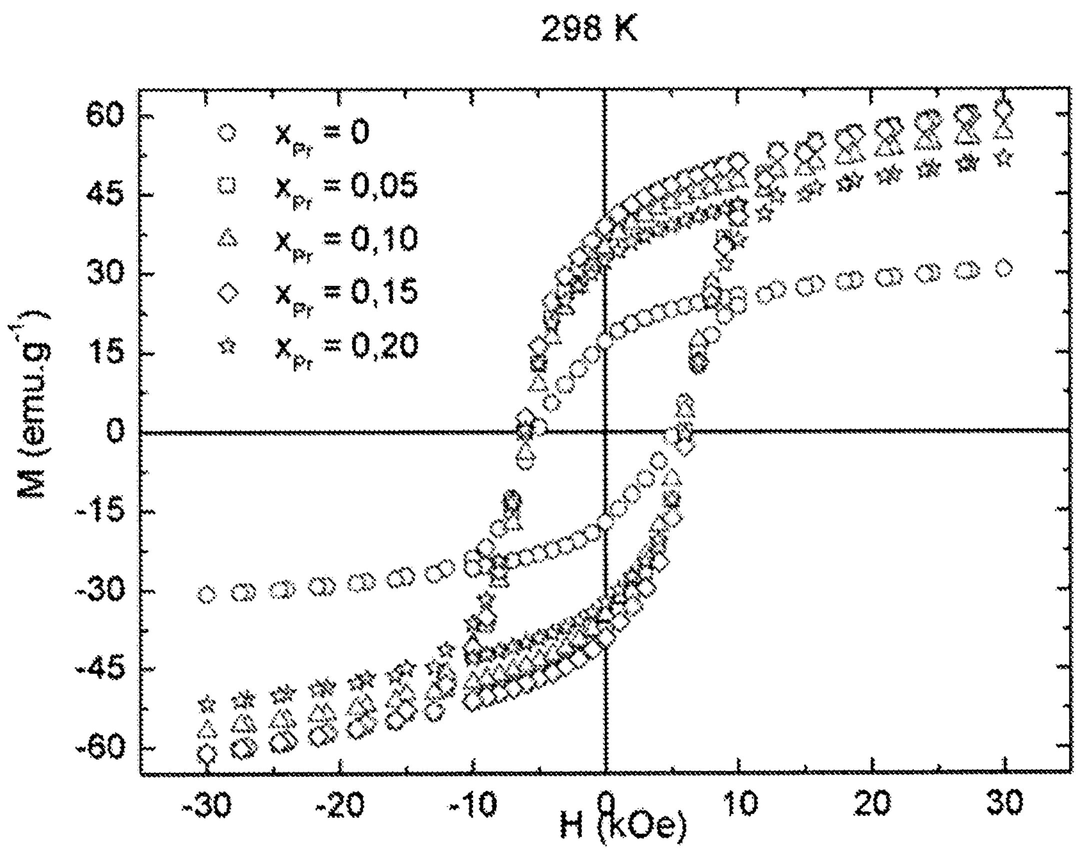
FIG. 1 show hysteresis cycles (FIG. 1*a*) and magnetic induction field versus energy product (BH) curves (FIG. 1*b*) of cobalt ferrites of the composition $MFe_{2-x}R_xO_4$ (M: Co and R: Pr; $0<x<0.2$) synthesized at 145° C. for 2 h, for a basicity level of 7, for an order of introduction of the precursors MRBF into the autoclave, and without prior heating of the precursors.

Hereinafter is described a summary of the invention and the associated vocabulary, before presenting the drawbacks of the prior art, and finally showing in more detail how the invention remedies them.

The term "nanoparticle" may correspond to an assembly of atoms, at least one dimension of which is on the nanometer scale, that is to say at least one dimension is less than or equal to 100 nm, for example less than 100 nm. Preferably, a nanoparticle may correspond to an assembly of atoms, the three dimensions of which are on the nanometer scale, for example a particle, the nominal diameter of which is less than 100 nm. The nominal diameter can for example be measured by transmission electron microscopy or scanning electron microscopy.

The term "nanocomposite", within the meaning of the present invention, may correspond to a nanoparticle having characteristics of a composite material, namely the presence of at least two phases.

As used herein, the term "magnetic nanoparticles" or "magnetic nanocomposites" may correspond to ferromagnetic and ferrimagnetic, paramagnetic, superparamagnetic, and antiferromagnetic materials. Furthermore, an iron oxide-based nanoparticle or, in the context of the present invention, an iron oxide-based magnetic nanocomposite, will comprise iron oxides for example in the form of spinel ferrite. In addition to these iron oxides, an iron oxide-based magnetic nanoparticle or nanocomposite may advantageously include hydroxides and/or oxyhydroxides. These hydroxides and/or oxyhydroxides may be, for example, rare earth hydroxides and/or oxyhydroxides and metal hydroxides and/or oxyhydroxides.

The term "autoclave", within the meaning of the present invention, preferably corresponds to a reactor configured to allow a pressure rise of its contents above atmospheric pressure and a temperature rise of its contents above the boiling temperature (for example above 100° C.).

The term "substantially equal", within the meaning of the present invention, may correspond to a value varying by less than 15% with respect to the compared value, preferably by less than 10%, even more preferably by less than 5%.

Within the meaning of the present invention, a "space group" of a crystal is generally constituted by the set of symmetries of a crystal structure, that is to say the set of affine isometries leaving the structure invariant.

The expression "ambient temperature" may correspond to a temperature less than or equal to 50° C., preferably less than or equal to 30° C., for example between 10° C. and 40° C., preferably between 15° C. and 30° C.

The present inventors have surprisingly discovered that for a given precursor composition and a given production method, varying certain production parameters can easily modulate the magnetic properties of nanoparticles, and thus make said precursor composition multifunctional. In particular, these parameters include the order of introduction of the precursors into the autoclave in step (a).

As will be detailed below, the magnetic nanoparticles preferably form composites (intrinsic or extrinsic) consisting of a main phase and one or more secondary phases. Thus, magnetic nanoparticles can also be called magnetic nanocomposites.

These magnetic nanocomposites can be produced for use as hard magnetic materials for permanent magnets, as semi-hard magnetic materials for magnetic recording, as soft magnetic materials for electronic components (inductors or transformers), as contrast agents, as tracers, as agents for the treatment of cancer by magnetic hyperthermia, as antibacterial agents, and for all applications to ferrites in which it is interesting to be able to modulate the structural, microstructural, and magnetic characteristics of the nanocomposites without modifying the dielectric properties.

The iron oxide-based magnetic nanoparticles or nanocomposites referred to herein are preferably particles having a cubic shape for the main phase, a nanowire shape for $R(OH)_3$ with a size of the main phase in the range of 1 to 1000 nm in effective diameter. In one embodiment, the size of the main phase of the magnetic nanocomposites (spinel phase) of the present invention are in the range of about 10 to 250 nm, about 20 to 250 nm, about 30 to 250 nm, about 10 to 200 nm, preferably about 20 to 200 nm, 30 to 200 nm, or 50 to 150 nm in effective diameter, with an average size of the magnetic nanocomposites (spinel phase) of about 150 nm.

For example, the magnetic nanoparticles or nanocomposites according to the invention may be based on Fe—Co, Fe—Ni, Fe—Zn, Fe—Cu, Fe—Co—Ni, Fe—Co—Zn, Fe—Ni—Zn, Fe—Co—Ni—Zn, or Fe—Co—Ni—Zn—Cu ferrites.

Preferably, the magnetic nanocomposites according to the invention are based on ferrites such as Fe—Zn ferrite, Fe—Ni ferrite, Fe—Co ferrite, Fe—Cu ferrite, Fe—Mn ferrite, Fe—Ag ferrite, Fe—Ni—Zn ferrite, Fe—Cu—Zn ferrite, Fe—Mn—Zn ferrite, Fe—Co—Zn ferrite, Fe—Ag—Zn ferrite, Fe—Co—Cu ferrite, Fe—Co—Mn ferrite, Fe—Co—Ni ferrite, Fe—Co—Ag ferrite, Fe—Ni—Cu ferrite, Fe—Mn—Cu ferrite, Fe—Zn—Cu ferrite, Fe—Ag—Cu ferrite, Fe—Ni—Zn—Cu ferrite, Fe—Ni—Zn—Mn ferrite, Fe—Ni—Zn—Co ferrite, Fe—Ni—Zn—Ag ferrite, Fe—Ni—Zn—Cu—Mn ferrite, Fe—Ni—Zn—Cu—Ag ferrite, Fe—Ni—Zn—Co—Mn ferrite, FeNi—Zn—Co—Ag ferrite, Fe—Ni—Zn—Co—Cu ferrite, and Fe—Ni—Zn—Co—Cu—Mn ferrite.

As mentioned, the magnetic nanoparticles resulting from the method according to the invention can advantageously form magnetic composites, or magnetic nanocomposites, consisting of a main phase and one or more secondary phases making their magnetic properties multifunctional.

The magnetic composites, or nanocomposites, can be intrinsic or extrinsic, that is to say comprising a mixture of phases depending on the production parameters used.

The main phase of the resulting composites, or nanocomposites, can be, for example, spinel ferrite with a face-centered cubic structure and a space group $Fd\bar{3}m$.

The secondary phases, for example $M'_2(OH)_2O_2$ with M': M or Fe, and $R(OH)_3$ with R: rare earths, can crystallize in a face-centered cubic and hexagonal structure of space group $Fd\bar{3}m$ and $P6\bar{3}/m$, respectively. In particular, the secondary phases, for example $Fe_2(OH)_2O_2$, and $Pr(OH)_3$, crystallize in a face-centered cubic and hexagonal structure of space group $Fd\bar{3}m$ and $P6\bar{3}/m$, respectively.

Preferably, these spinel ferrites have the empirical formula $M_{1-y}T_yFe_{2-x-y}R_xT_yO_4$ where M and T are transition metals (for example: M: Co, Fe, Ni, Cu, Mn, Zn; R: Sm, Pr, Dy, . . . ; and T: Zn, Cu, Mn, . . . ).

For example, the ferrites $CoFe_{2-w}Pr_wO_4$ ($0<w<2$) are synthesized by dissolving in water NaOH, $CoCl_2 \cdot 6H_2O$, $FeCl_3 \cdot 6H_2O$, and/or $PrCl_3 \cdot xH_2O$ or anhydrous.

Thus, the main phase may be a spinel ferrite of the empirical formula $Co_xNi_yZn_zCu_uMn_vAg_tFe_{2-w}R_wO_4$, with $$x+y+z+u+v+t=1$$

R: La, Ce, Pr, Nd, Pm, Sm, Eu, Gd, Tb, Dy, Ho, Er, Tm, Yb, and Lu w being between 0 and 2.

The nanoparticles or nanocomposites from the method according to the invention may belong to a category of a soft magnetic material, or a semi-hard magnetic material, or a hard magnetic material depending on the selected production parameters.

The coercive field of hard magnetic nanocomposites is preferably greater than 5 kOe (500 mT).

The coercive field of semi-hard magnetic nanocomposites can vary between 1 kOe (100 mT) and 5 kOe (500 mT).

The coercive field of soft nanocomposites is preferably less than 1 kOe (100 mT).

The iron oxide-based magnetic nanocomposites according to the invention may include a rare earth R such as praseodymium Pr, samarium Sm, dysprosium Dy, etc. In particular, the iron oxide-based magnetic nanocomposites according to the invention may be substituted with a rare earth R such as praseodymium Pr, samarium Sm, dysprosium Dy, etc.

The iron oxide-based magnetic nanocomposites according to the invention are synthesized by the combination of two synthesis methods: co-precipitation of precursors and hydrothermal (water as solvent) and/or solvothermal (solvent other than water) synthesis.

In a preferred embodiment, the iron oxide-based magnetic nanocomposites according to the invention are synthesized by the following method: separate dissolution of each of the precursors in different containers and in a same solvent (step a0), combination with a certain order of the solutions in which the precursors have been dissolved (step a), hydro and/or solvothermal production (step b), and washing (step c) which is not followed by calcination, thereby allowing the hydroxide and/or oxyhydroxide secondary phases to be retained in the magnetic nanocomposites.

The inventors have surprisingly discovered that preserving the secondary phases affects the magnetic properties of the synthesized magnetic nanocomposites.

Specifically, in a step a0), separate dissolutions with a same solvent are carried out at a given temperature (with or without heating, and when heating occurs, it is followed by cooling to the given temperature) of:

an iron-based precursor (F) in a solvent in a first container,
at least one metal precursor (M) other than an iron-based precursor in a solvent in a second container,
optionally at least one rare earth precursor (R), and
a base in a solvent in a third container.

Step a) of the method according to the invention which follows step a0) is then a co-precipitation of solutions based on an iron-based precursor (F) and at least one metal precursor (M) other than an iron-based precursor and optionally at least one rare earth precursor (R) in an autoclave in the presence of the solution containing the base (B).

More precisely, in a step a), the time between each introduction of the precursors varies between 0 and 3600 s, preferably between 1 s and 360 s, more preferably between 1 and 36 s, and more preferably between 3 and 6 s.

Co-precipitation synthesis is a widely used method for the production of magnetic nanoparticles and is known to the state of the art.

The method of the invention can be used to synthesize ferrite ($Fe_3O_4$) nanoparticles, as well as many other ferrites, such as Fe—Zn ferrite, Fe—Ni ferrite, Fe—Co ferrite, Fe—Cu ferrite, Fe—Mn ferrite, Fe—Ag ferrite, Fe—Ni—Zn ferrite, Fe—Cu—Zn ferrite, Fe—Mn—Zn ferrite, Fe—Co—Zn ferrite, Fe—Ag—Zn ferrite, Fe—Co—Cu ferrite, Fe—Co—Mn ferrite, Fe—Co—Ni ferrite, Fe—Co—Ag ferrite, Fe—Ni—Cu ferrite, Fe—Mn—Cu ferrite, Fe—Zn—Cu ferrite, Fe—Ag—Cu ferrite, Fe—Ni—Zn—Cu ferrite, Fe—Ni—Zn—Mn ferrite, Fe—Ni—Zn—Co ferrite, Fe—Ni—Zn—Ag ferrite, Fe—Ni—Zn—Cu—Mn ferrite, Fe—Ni—Zn—Cu—Ag ferrite, Fe—Ni—Zn—Co—Mn ferrite, Fe—Ni—Zn—Co—Ag ferrite, Fe—Ni—Zn—Co—Cu ferrite, and Fe—Ni—Zn—Co—Cu—Mn ferrite. Fine ferrite particles are obtained by the method of the invention from aqueous solutions of trivalent $Fe^{3+}$ and bivalent metal $Me^{2+}$, where $Me^{2+}$ can be $Fe^{2+}$, $Mn^{2+}$, $Co^{2+}$, $Ni^{2+}$, $Cu^{2+}$, $Ag^{2+}$, and/or $Zn^{2+}$.

According to one embodiment, the pH during co-precipitation is between 0.1 and 14, preferably between 7 and 14, and more preferably between 8 and 12.

Preferably, the hydrothermal and/or solvothermal production is carried out at a basicity level b $$\left(b = \frac{n_B}{\sum n_{M'}} = \frac{[B]}{\sum [M']},\ b\text{: base and } M' = M \text{ and } R\right)$$

of 0 to 100, preferably between 5 and 25, more preferably between 6 and 8, and even more preferably 7.

The inventors have surprisingly discovered that the value of the basicity level, especially during the hydrothermal and/or solvothermal production step, has a significant influence on the magnetic properties of the synthesized magnetic nanocomposites.

According to one embodiment, in step (a) of the method of the invention, $Fe^{3+}/M^{2+}$ are present at a ratio of 2:1.

According to one embodiment, the method of the invention is carried out in an oxidizing environment (steps a0 and a); an oxidizing or non-oxidizing environment (step b), and an oxidizing or non-oxidizing environment (step c). Being very sensitive to oxidation, magnetite ($Fe_3O_4$) is transformed to maghemite ($\gamma Fe_2O_3$) in the presence of oxygen.

The size and shape of the magnetic nanocomposites can be controlled by adjusting the basicity level b, the rate of hydrolysis h, the choice of solvent (the nature of the polyol), the nature of the base, the position of the hydroxide ions, the nature of the salts (perchlorates, chlorides, sulfates, and nitrates), the ionic strength, the heating temperature, the synthesis temperature, and the M (II)/Fe (III) concentration ratio.

The inventors have also surprisingly discovered that the value of the hydrolysis rate, especially during the hydrothermal production step, has a significant influence on the morphology and thus on the magnetic properties of the synthesized magnetic nanocomposites.

According to one embodiment, the iron-based precursor (F) is selected from iron chlorides ($FeCl_2$, $FeCl_3$), iron nitrates ($Fe(NO_3)_3$), iron acetates, preferably iron II acetate ($Fe(CO_2CH_3)_2$), iron sulfates, preferably monohydrate ($FeSO_4 \cdot H_2O$) or heptahydrate ($FeSO_4.7H_2O$); preferably the iron precursor (F) is an iron chloride ($FeCl_2$, $FeCl_3$), more preferably ferric chloride hexahydrate ($FeCl_3 \cdot 6H_2O$).

According to one embodiment, the one or more metal precursors (M) other than an iron-based precursor is/are selected from metal chlorides, metal nitrates, metal acetates, metal sulfates, and/or from cobalt-, nickel-, manganese-, magnesium-, zinc-, and copper-based precursors, preferably cobalt-based precursors, more preferably a cobalt chloride.

According to one embodiment, the one or more rare earth precursors (R) is/are selected from rare earth chlorides, rare earth nitrates, rare earth acetates, rare earth sulfates, and/or from lanthanum, cerium, praseodymium, neodymium, promethium, samarium, europium, gadolinium, terbium, dysprosium, holmium, erbium, thulium, ytterbium, lutetium, scandium, and yttrium, preferably praseodymium.

According to one embodiment, the one or more bases is/are selected from sodium oxide $Na_2O$ and sodium hydroxide or soda (NaOH); potassium oxide $K_2O$ and potassium hydroxide or potash (KOH); cesium oxide $Cs_2O$ and cesium hydroxide (CsOH); calcium oxide CaO and calcium hydroxide ($Ca(OH)_2$); barium oxide BaO and barium hydroxide ($Ba(OH)_2$); or amide ion ($NH^{2-}$), preferably sodium hydroxide (NaOH).

According to a preferred embodiment, the precursors of the dissolution of step a0) comprise iron chloride, cobalt chloride, and praseodymium, in the presence of sodium hydroxide. According to a preferred embodiment, the precursors of the co-precipitation of step a) comprise iron chloride, cobalt chloride, and praseodymium, in the presence of sodium hydroxide.

The initial concentration of each dissolved precursor may play a role in the properties of the magnetic nanocomposites according to the invention. It is therefore possible to modulate the one or more concentrations of the precursors during the dissolution of step a0) in order to easily modify the magnetic properties of the nanocomposites according to the invention.

According to one embodiment, the precursors dissolved in step a0) comprise:

from 0.001 to 100 $mol \cdot L^{-1}$ of an iron-based precursor, preferably between 0.01 and 0.1 $mol \cdot L^{-1}$, and particularly between 0.0192 and 0.312 $mol \cdot L^{-1}$; and
from 0.001 to 100 $mol \cdot L^{-1}$ of a cobalt-based precursor, preferably between 0.01 and 1 $mol \cdot L^{-1}$, and particularly between 0.016 and 0.639 $mol \cdot L^{-1}$; and/or
from 0.001 to 100 $mol \cdot L^{-1}$ of a nickel-based precursor, preferably between 0.01 and 1 $mol \cdot L^{-1}$, and particularly between 0.016 and 0.639 $mol \cdot L^{-1}$; and/or from 0.001 to 100 $mol \cdot L^{-1}$ of a zinc-based precursor, preferably between 0.01 and 1 $mol \cdot L^{-1}$, and particularly between 0.016 and 0.639 $mol \cdot L^{-1}$; and/or from 0.001 to 100 $mol \cdot L^{-1}$ of a copper-based precursor, preferably between 0.01 to 1 $mol \cdot L^{-1}$, and particularly between 0.016 and 0.639 $mol \cdot L^{-1}$; and/or from 0 to 10 $mol \cdot L^{-1}$ of a rare-earth-based precursor, preferably between 0 and 1 $mol \cdot L^{-1}$, and particularly between 0 and 0.160 $mol \cdot L^{-1}$; and from 0.1 to 1000 $mol \cdot L^{-1}$ of a base, preferably between 0.1 and 100 $mol \cdot L^{-1}$, and particularly between 1 and 20 $mol \cdot L^{-1}$; said concentrations being the concentrations of the precursors when they are introduced into the autoclave, that is to say at the beginning of the co-precipitation step a).

Whether the precursors are preheated during step a0) may also play a role in the properties of the magnetic nanocomposites according to the invention. It is therefore possible to modulate the heating of the precursors in order to easily modify the magnetic properties of the magnetic nanocomposites according to the invention.

According to one embodiment, the precursors are heated during the dissolution of step a0), preferably to a temperature between 30° C. and 100° C., more preferably between 40 and 90° C., even more preferably between 50 and 80° C., even more preferably between 65 and 75° C., even more preferably 70° C.; then they are cooled down to room temperature before being put together with the base to co-precipitate in the autoclave.

According to another embodiment, the precursors are not heated during the dissolution in step a0).

Whether the at least one of the precursors is hydrated may also play a role in the properties of the magnetic nanocomposites according to the invention. It is therefore possible to modulate the hydration of the precursors in order to modify the morphology of the nanoparticles and to easily modify the magnetic properties of the magnetic nanocomposites according to the invention.

According to one embodiment, the iron-based precursor and/or at least one metal precursor other than the iron-based precursor is/are used in its/their anhydrous form.

According to another embodiment, the iron-based precursor and/or at least one metal precursor other than the iron-based precursor is/are used in its/their hydrated form.

The order of introduction of the precursors during step a) into the autoclave may play a role on the properties of the magnetic nanocomposites according to the invention and make them multifunctional for a given composition (see Examples 2 and 7).

In step a) of the method according to the invention, the precursors are successively co-precipitated in an autoclave in the presence of at least one base. The inventors have surprisingly discovered that the order in which the various precursors and the one or more bases are introduced into the autoclave affects the magnetic properties of the magnetic nanocomposites thus synthesized.

For example, for magnetic nanocomposites of the formula $MFe_{1.925}R_{0.075}O_4$ (M: Co and R: Pr), the order MRBF (where F is iron, M is cobalt, B is base (NaOH), and R is praseodymium) allows the production of hard magnetic nanocomposites (high coercive field) whereas the order RMFB allows the production of soft magnetic nanocomposites (low coercive field), and this is for a same method (see Examples 2 and 7).

The compounds of steps a0) and a) are introduced into the autoclave according to:

one of the following orders in the absence of at least one rare earth precursor: MBF, MFB, FMB, FBM, BMF, or BFM, preferably MBF or MFB;

where

F is an iron-based precursor,

M is the one or more metal precursors other than an iron-based precursor, and

B is the one or more bases;

or one of the following orders if at least one rare-earth precursor is present in step a):

MRFB, MRBF, MFRB, MFBR, MBFR, MBRF, RMFB, RMBF, RFMB, RFBM, RBFM, RBMF, BRFM, BRMF, BFMR, BFRM, BMFR, BMRF, FRBM, FRMB, FMRB, FMBR, FBRM, or FBMR, preferably MRBF, RMFB, FRBM, BFRM, or MBRF, more preferably MRBF or RMFB;

where

R is the one or more rare earth precursors.

According to a preferred embodiment of the invention, the precursors used are iron chloride, preferably $FeCl_3 \cdot 6H_2O$, cobalt chloride, preferably $CoCl_2 \cdot 6H_2O$, and praseodymium chloride ($PrCl_3$), in the presence of sodium hydroxide to produce multifunctional magnetic nanocomposites of the formula $MFe_{1.925}R_{0.075}O_4$ (M: Co and R: Pr).

According to the preferred embodiment of the preceding paragraph, the preferred orders for introducing the precursors into the autoclave are MRBF, RMFB, FRBM, BFRM, or MBRF, more preferably MRBF or RMFB.

Also in this preferred embodiment:

the order MRBF allows the production of hard magnetic nanocomposites, preferably having a coercive field (Hc) between 5 kOe (500 mT) and 7 kOe (700 mT), more preferably between 6 kOe (600 mT) and 7 kOe (700 mT), even more preferably between 6.25 kOe (625 mT) and 6.75 kOe (675 mT).

The orders BFRM and MBRF allow the production of semi-hard magnetic nanocomposites, preferably having a coercive field Hc between 3 kOe (300 mT) and 5 kOe (500 mT), more preferably between 3.5 kOe (350 mT) and 4.5 kOe (450 mT).

The order FRBM allows the production of semi-hard magnetic nanocomposites, preferably having a coercive field Hc between 1 kOe (100 mT) and 4 kOe (400 mT), more preferably between 2 kOe (200 mT) and 3 kOe (300 mT).

The order RMFB allows the production of soft magnetic nanocomposites, preferably having a coercive field Hc between 0.5 kOe (50 mT) and 1 kOe (100 mT), more preferably between 0.6 kOe (60 mT) and 0.8 kOe (80 mT).

Surprisingly, it is therefore easy to manipulate the order of the precursors to obtain magnetic nanocomposites with the desired magnetic properties.

Step b) of the method according to the invention comprises hydrothermal and/or solvothermal production.

Hydrothermal or solvothermal production includes the various techniques of crystallizing substances from aqueous solutions at high temperatures and high vapor pressures.

Hydrothermal or solvothermal production can be defined as a heterogeneous or homogeneous chemical reaction in the presence of an aqueous (hydrothermal production) or non-aqueous (solvothermal production) solvent taking place at a temperature close to or above the boiling temperature of the solvent. This results in a pressure generally greater than one atmosphere in a closed system.

Hydrothermal/solvothermal production allows the production of magnetic nanocomposites and has advantages over other traditional production routes such as thermal decomposition reactions carried out at high temperature and in an inert atmosphere ("Schlenk" line). Indeed, since the device consists of a closed chamber, a significant pressure is spontaneously created in this chamber and allows the reactivity between the precursors to be increased. These precursors can crystallize and form composites of well-defined morphology and size at a lower temperature than the temperature required to perform the same reaction at atmospheric pressure. This type of production allows high pressures and high temperatures to be reached thanks to the closed chamber and depending on the selected conditions. There are also hydrothermal reactors in which a high external pressure can be applied (that is to say exogenous pressure) to enhance these conditions. However, preferably, a production method according to the present invention does not involve the implementation of an exogenous pressure.

This technique is effective for the production of controlled high purity, high crystallinity, size distribution and morphology powders; these characteristics as well as the magnetic characteristics can in particular be influenced by the reaction time, the pressure in the autoclave, the production temperature, the heating rate, the basicity level b, the hydrolysis rate h, the nature of the solvent, and the position of $OH^-$ ions in the solvent.

Hydrothermal or solvothermal production is well known in the state of the art.

According to one embodiment, the solvothermal production has as solvent a compound selected from ethylene glycol (EG), diethylene glycol (DEG), polyethylene glycol (PEG), butanol, butan-2-ol, propanol, propan-2-ol, preferably polyol.

According to one embodiment, the volume ratio between solvent and autoclave volume varies from 0.3 to 1, preferably a ratio substantially equal to 0.75, preferably equal to 0.75.

According to one embodiment, hydrothermal and/or solvothermal production is carried out at a pressure between 1 bar and 300 bar, preferably between 1 and 100 bar, more preferably between 1 and 5 bar, even more preferably between 1 and 3 bar. According to a preferred embodiment, hydrothermal and/or solvothermal production takes place at a pressure between 1.1 bar and 300 bar, preferably between 1.1 and 100 bar, more preferably between 1.2 and 5 bar, even more preferably between 1.3 and 3 bar.

According to one embodiment, hydrothermal and/or solvothermal production is carried out at a temperature between 30° C. and 350° C., preferably between 50° C. and 200° C., more preferably between 50° C. and 150° C., even more preferably between 130° C. and 150° C.

According to one embodiment, the heating or cooling rate during hydrothermal and/or solvothermal production is between 1° C./min and 20° C./min, preferably between 1.5° C./min and 10° C./min, more preferably between 1.5° C./min and 2° C./min.

According to one embodiment, the duration of the heating stage is between 0 min and 168 h, preferably between 1 h and 72 h, preferably between 1 h and 6 h, more preferably between 1 h 45 and 2 h 15, and more preferably 2 h.

According to one embodiment, hydrothermal production is carried out at a hydrolysis rate h $$\left(h = \frac{n_{H_2O}}{\sum n_{M'}} = \frac{[H_2O]}{\sum [M']},\ M' = M \text{ and } R\right)$$

of 0 to 10,000, preferably between 5 and 5,000, more preferably between 50 and 500, and even more preferably between 450 and 500.

According to one embodiment, the solvothermal production is carried out at a hydrolysis rate h $$\left(h = \frac{n_{H_2O}}{\sum n_{M'}} = \frac{[H_2O]}{\sum [M']},\ M' = M \text{ and } R\right)$$

of 0 to 100, preferably between 1 and 50, more preferably between 1 and 20, and even more preferably between 1 and 12.

In addition, the production method according to the invention may include a washing step. For example, the washing may include washes with organic or aqueous solvents. For example, washing may include one wash with the same solvent, six washes with ethanol, and three washes with acetone.

The invention also relates to iron oxide-based magnetic nanoparticles, such as magnetic nanocomposites, that can be obtained by a production method according to the invention. Preferably, the invention also relates to iron oxide-based magnetic nanoparticles, such as magnetic nanocomposites, from a production method according to the invention.

These magnetic nanocomposites comprise a main phase and one or more secondary phases $M'_2(OH)_2O_2$, and/or $R(OH)_3$, with: M'=Fe or M, M selected from metal chlorides, metal nitrates, metal acetates, metal sulfates, and/or from cobalt-, nickel-, zinc-, and/or copper-based precursors, preferably cobalt-based precursors, more preferably a cobalt chloride;

R: La, Ce, Pr, Nd, Pm, Sm, Eu, Gd, Tb, Dy, Ho, Er, Tm, Yb, and Lu.

These phases allow the magnet grade of the magnetic nanocomposites to be modulated, where the magnet grade of the magnetic nanocomposites may preferably correspond to: soft magnetic material, or semi-hard magnetic material, or hard magnetic material.

The invention also relates to a composition comprising iron oxide-based magnetic nanoparticles, such as magnetic nanocomposites, that can be obtained by, or resulting from, the production method according to the invention.

Preferably, the magnetic nanoparticles form composites (intrinsic or extrinsic) consisting of a main phase and one or more secondary phases. Thus, magnetic nanoparticles can be called magnetic nanocomposites.

The main phase is preferably a spinel ferrite of face-centered cubic structure and space group $Fd\bar{3}m$. Preferably, the one or more secondary phases is/are face-centered cubic and hexagonal structure(s) of space group $Fd\bar{3}m$ and $P6\bar{3}/m$, respectively.

Preferably, the magnetic nanoparticles or magnetic nanocomposites have a coercive field between 10 Oe (1 mT) and 20 kOe (2 T), preferably between 0.5 kOe (50 mT) and 10 kOe (1 T).

The composition or nanocomposites can be used in a therapeutic method, preferably in a magnetic hyperthermia method.

Magnetic hyperthermia is based on targeting cancer cells with functionalized magnetic nanocomposites. Once the nanoparticles are functionalized, they target the cancer cells and attach to them via ligands, where the application of a high frequency external alternating magnetic field (typically of the order of hundreds of kHz) with a very intense magnetic field (>1 T) makes it possible to generate a very localized rise in temperature. If this temperature can be maintained above the therapeutic threshold of 42° C. for 30 minutes or more, the target or tumor cells are destroyed.

Magnetic hyperthermia is based on the use of magnetic nanocomposites with very interesting magnetic properties such as soft and/or semi-hard and/or hard nanoferrites.

According to one embodiment, said magnetic nanocomposites from this method of the invention may be functionalized with PEG and/or folic acid in the production method according to the invention.

According to one embodiment, the magnetic nanocomposites resulting from this method of the invention can be grafted with anti-cancer peptides.

According to one embodiment, said magnetic nanocomposites resulting from the method of the invention may be grafted with antibacterial peptides.

The magnetic nanocomposites are preferably administered via a pharmaceutically acceptable carrier. In one embodiment, the magnetic nanocomposites according to the invention are mixed in a liquid suspension or are encapsulated in microcapsules, which can then be mixed with a suitable biocompatible medium. For example, the magnetic particles may be bound in a matrix material to form a microcapsule. The important properties of microcapsules are their density and diameter. Density affects the efficiency of their transport by blood flow to the immobilization site in the vascular network of diseased tissue, while size determines the proximity of the immobilization site to the diseased tissue.

In one embodiment, biocompatible coatings may be used to minimize metallic interaction of the alloy particles with biological compounds, if necessary to improve the biocompatibility of the magnetic particles.

In one embodiment, the composition comprises a polymer material. For example, the magnetic nanocomposites may be dispersed or encapsulated in a biocompatible polymer. By "polymer" is meant that the composition comprises one or more oligomers, polymers, copolymers, or mixtures thereof.

In one embodiment, the matrix material comprises a thermoplastic polymer. Examples of polymers include polyvinyl alcohol, polyethylene glycol, ethyl cellulose, polyolefins, polyesters, non-peptidic polyamines, polyamides, polycarbonates, polyalkenes, polyvinyl ethers, polyglycolides, cellulose ethers, polyvinyl halides, polyhydroxyalkanoates, polyanhydrides, polystyrenes, polyetacrylates, polyethanescrates, and copolymers and mixtures thereof.

For in vivo use, the polymer material may be biocompatible and preferably biodegradable. Examples of suitable polymers include ethyl celluloses, polystyrenes, poly(e-caprolactone), poly(D,L-lactic acid) and poly(D,L-lactic acid-co-glycolic acid). The polymer is preferably a copolymer of lactic acid and glycolic acid (for example PLGA).

In one embodiment, the magnetic nanocomposites and a drug are encapsulated in a heat-sensitive material. When these magnetic nanocomposites are heated, the heat generated melts the heat-sensitive encapsulating material, thus releasing the transported drug, for example, at the tumor or treatment site, and heats the tumor to further facilitate treatment at the tumor site.

In another embodiment, the composition further comprises a drug or radiosensitizing agent, as known in the prior art.

In a preferred embodiment, the drug is a chemotherapeutic agent. Representative examples of chemotherapeutic agents known in the art include platinums, such as carboplatin and cisplatin, taxanes, such as docetaxel and paclitaxel, gemcitabine, VP16, mitomycin, idoxuridine, topoisomerase 1 inhibitors such as irinotecan, topotecan and camptothecins, nitrosoureas, such as BCNU, ACNU or MCNU, methotrexate, bleomycin, adriamycin, cytoxan and vincristine, immunomodulatory cytokines, such as IL2, IL6, IL12 and IL13, and interferons. Some chemotherapeutic agents are known to be potentiated by heating the tissue and/or the chemotherapeutic agent. Examples of heat-activated or heat-enhanced chemotherapeutic agents include bleomycin, BCNU, cisplatin, cyclophosphamide, melphalan, mitoxantrone, mitomycin C, thiotepa, misonidazole, 5-thio-D-glucose, amphotericin B, cysteine, cysteamine, and AET. Representative examples of radiosensitizing agents include misonidazole, pimonidazole, 5-fluorouracil, and 2,4-dinitroimidazole-1-ethanol. The one skilled in the art can select the one or more appropriate agents for the particular patient, cancer, or indication.

In one embodiment, the composition comprises a suitable pharmaceutically acceptable carrier. For example, the carrier may be a pharmaceutically acceptable excipient for injection. The pharmaceutically acceptable excipient may be any aqueous or non-aqueous excipient known in the art. Examples of aqueous excipients include physiological saline solutions, sugar solutions such as dextrose or mannitol, and pharmaceutically acceptable buffered solutions, and examples of non-aqueous excipients include fixed vegetable oils, glycerin, polyethylene glycols, alcohols, and ethyl oleate. The excipient may further comprise antibacterial preservatives, antioxidants, toning agents, buffers, stabilizers, or other components.

Typically, the magnetic hyperthermia method involves placing the magnetic material at a site for heating, and then exposing the magnetic material to an alternating magnetic field to generate hysteresis heat for a period of time effective for a particular result. While the site would often be in a patient's home for medical applications, the optional equipment could be used in industrial or non-medical applications.

In one embodiment, the microcapsules comprising the magnetic nanocomposites further comprise one or more drugs for release. In one embodiment, the drug is encapsulated in the same matrix material encapsulating the magnetic particles. In one method, drug release is essentially independent of the heating of the magnetic particles. In another method, drug release is enhanced or facilitated by heating the magnetic particles. The heating may operate to (1) increase the porosity of the matrix material, (2) increase the rate of molecular diffusion through the matrix material, (3) enhance biodegradation or dissolution of the matrix material, or (4) make combinations thereof.

For example, in one embodiment, the composition comprises magnetic nanocomposites that are coated or dispersed in a biocompatible polymer matrix material (for example, in the form of larger microparticles or nanoparticles) that contains the drug, and magnetic heating expands the polymer to allow diffusion of the drug to the tumor site.

The compositions according to the invention can also be used in other hyperthermia treatments in addition to cancer treatment. For example, magnetic hyperthermia can be used for pain relief, bleeding control, or in the treatment of prostatic hypertrophy or psoriasis.

The biocompatible composition may be delivered to diseased tissue in a patient by any means known in the art. Representative examples of appropriate routes of administration include intratumoral, peritumoral, and intravascular (for example, intra-arterial, intraperitoneal, subcutaneous, or intrathecal injection). In one embodiment, the biocompatible composition is delivered to the diseased tissue via the arterial or venous blood supply.

The magnetic field can be induced using simple magnets or other equipment well known in the art. The magnetic field strength required for effective alignment of the nanotubes can vary depending, for example, on the amount of magnetic material attached to the nanotubes, the viscosity of the fluid medium, and the distance between the magnetic field and the fluid medium. The basic principle that allows this method to work is a balance between the magnetic force generated by the applied field (which is a function of the magnetic susceptibility, the volume of the magnetic material, the magnetic field, and the magnetic field gradient) and the resistance force (which is directly proportional to the viscous resistance of the fluid medium).

In one embodiment, the magnetic field strength is between 0.5 and 3 T and more preferably between 0.5 and 1 T.

EXAMPLES

Example 1

Influence of Preheating the Precursors.

A method for producing magnetic nanoparticles according to the invention has been carried out and the nanoparticles thus produced have been characterized.

The reactor used during hydrothermal production is the "PARR 5500 Series compact reactor" consisting of: a 300 mL stainless steel autoclave, a 250 mL Teflon vessel, a VWR VO5 40 digital mechanical stirrer, and an Equilabo 4848 controller.

The total volume of solvent used ($H_2O$) is 150 mL for a total volume of 200 mL.

The basicity level is set at 7.

The hydrolysis rate is greater than 450.

The autoclave was heated at a rate between 2 and 3° C.·min$^{-1}$. The production temperature of 145° C. is maintained for 2 hours. At this temperature, the pressure is between 1 and 2 bar. At the end of this stage, the autoclave is cooled down to room temperature at the same rate as the heating.

Production was carried out under mechanical agitation at 300 rpm using a 4-blade propeller stirring system.

Figure 1B:
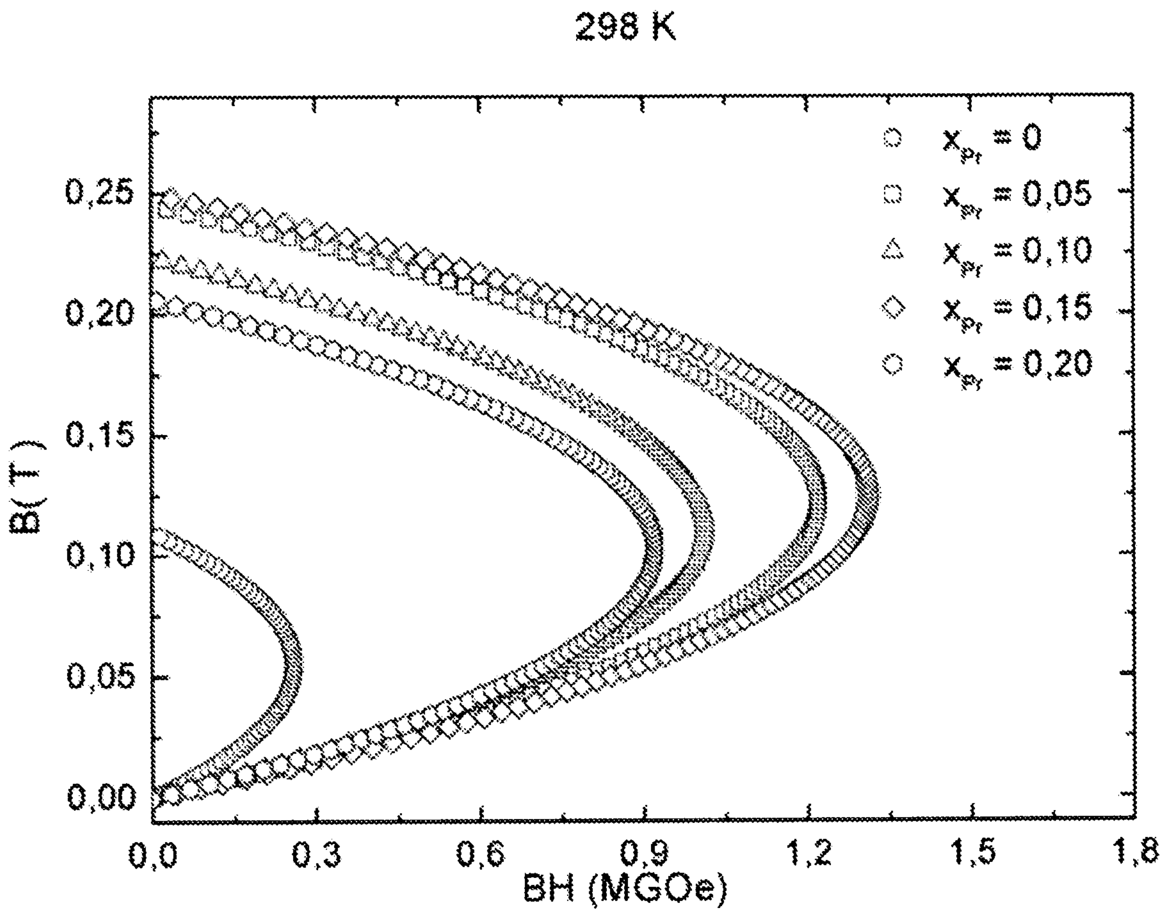

Example 1a) Without prior heating of the precursors and selecting the order of introduction of the precursors (in the autoclave) named MRBF With $CoCl_2 \cdot 6H_2O$ (M); $PrCl_3$ (R); NaOH (B); $FeCl_3 \cdot 6H_2O$ (F):

For the nanoparticles produced in this way, it was observed that the coercive field, $H_c$, is greater than 515 mT for x=0 (FIG. 1*a*) and reaches a value of 616 mT for x=0.15 (FIG. 1*a*). The saturation magnetization, $M_s$, is greater than 32 emu·g$^{-1}$ (x=0; FIG. 1*a*) and reaches a value of 63 emu·g$^{-1}$ (x=0.15; FIG. 1*a*). The energy product $(BH)_{max}$ is greater than 0.27 MGOe (x=0; FIG. 1*b*) and reaches a value of 1.31 MGOe (x=0.15; FIG. 1*a*).

Under these production conditions, the composition is multifunctional. The nanoparticles are magnetically hard with or without praseodymium.

Figure 2:
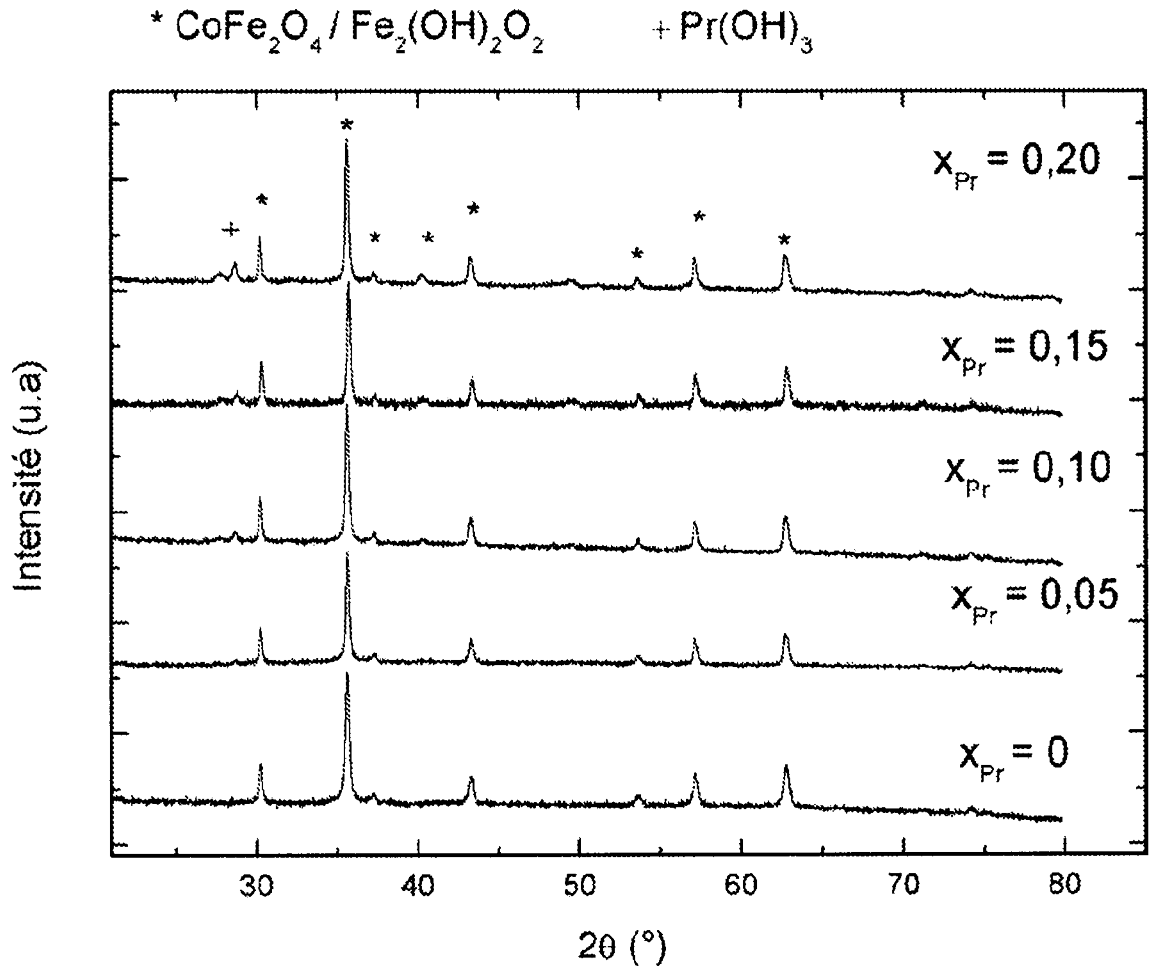
FIG. 2 shows X-ray diffractograms of cobalt ferrites of the composition $MFe_{2-x}R_xO_4$ (M: Co and R: Pr; $0<x<0.2$) in particular cobalt ferrites ($CoFe_{2-x}Pr_xO_4$, $0<x<0.2$) synthesized at 145° C. for 2 h, for a basicity level of 7, for an order of introduction of precursors MRBF into the autoclave, and without prior heating of the precursors.

The change in magnetic character (soft to hard) is explained by the presence of secondary phases $M'_2(OH)_2O_2$ and $R(OH)_3$ (M': M or Fe and R: Pr, FIG. 2).

Example 1b) The same method was carried out but this time with prior heating of the precursors.

Each precursor was previously dissolved in water at a temperature approximating 70° C. using a hot plate.

Figure 4A:
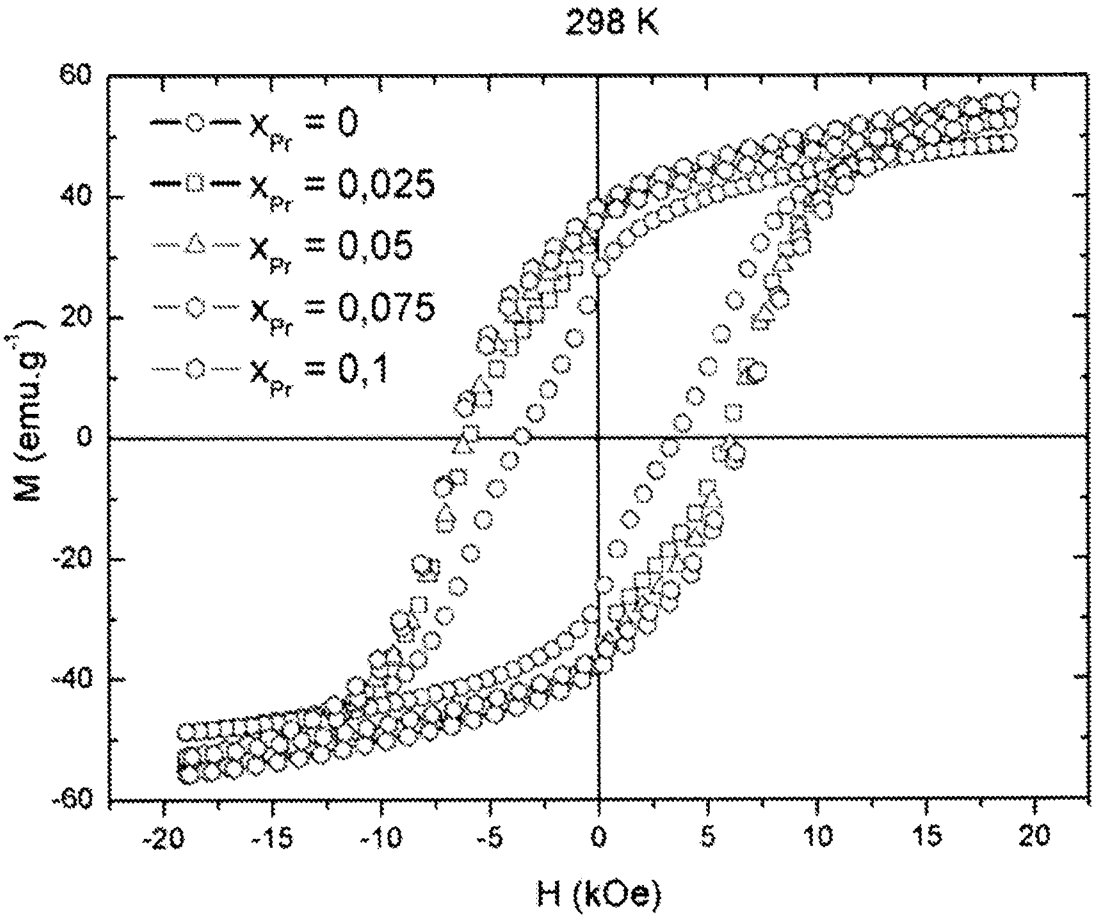
FIG. 4 show hysteresis cycles (FIG. 4*a*) and magnetic induction field versus energy product (BH) curves (FIG. 4*b*) of cobalt ferrites of the composition $MFe_{2-x}R_xO_4$ (M: Co and R: Pr; $0<x<0.1$) synthesized at 145° C. for 2 h, for an order of introduction of the precursors MRBF into the autoclave, with prior heating of the precursors.
Figure 4B:
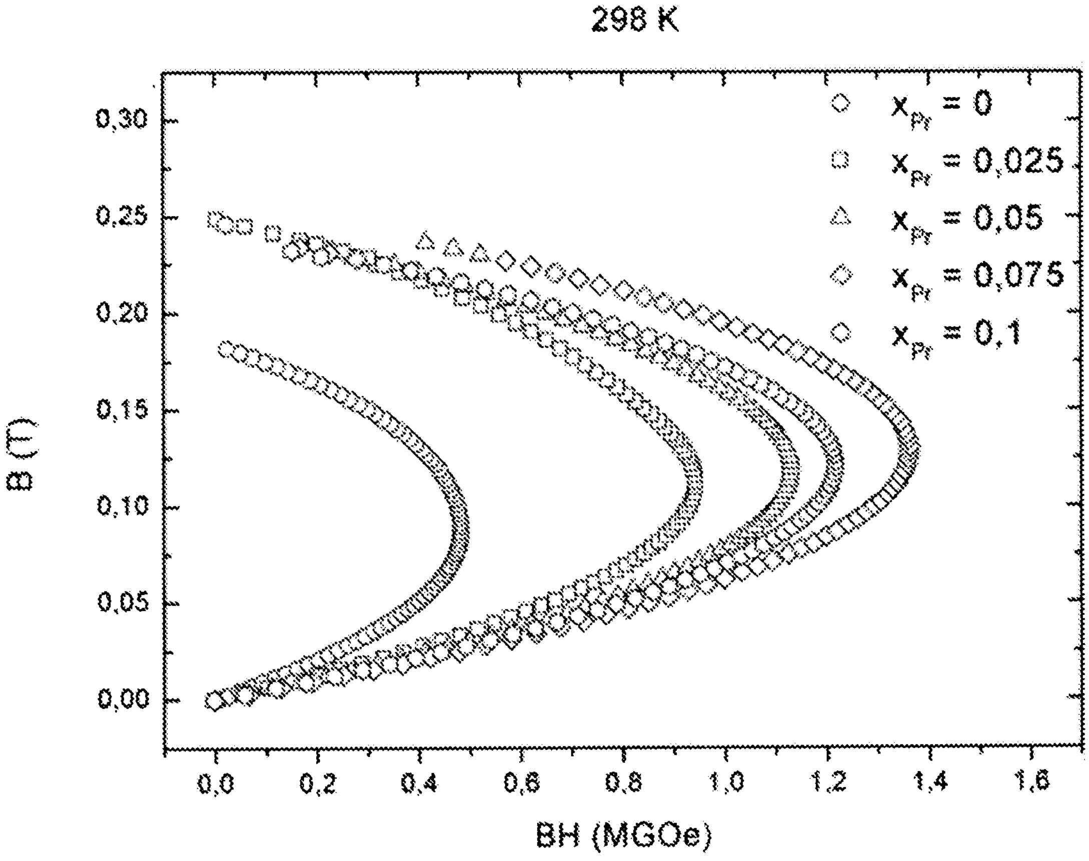

This time, it was observed that the value of $H_c$ is greater than 350 mT for x=0 (FIG. 4*a*) and reaches a value of 707 mT for x=0.15 (FIG. 4*a*). The saturation magnetization, $M_s$, is greater than 49 emu·g$^{-1}$ (x=0; FIG. 4*a*) and reaches a value of 55.7 emu·g$^{-1}$ (x=0.075; FIG. 4*a*). The energy product $(BH)_{max}$ is greater than 0.48 MGOe (x=0; FIG. 4*b*) and reaches a value of 1.36 MGOe (x=0.1; FIG. 4*b*).

Under these production conditions, the material is also magnetically hard, but a difference in coercivity of 165 mT for x=0 and +91 mT for x=0.15 between Example 1a) and 1b) is observed, the only difference being the prior heating of the precursors.

The increase of the coercive field (FIG. 4*a*) is due to the coupling effect between the spinel ferrite and the secondary phases. Indeed, a shoulder is observed due to the presence of the secondary phases $Fe_2(OH)_2O_2$ and $Pr(OH)_3$. This effect is due to the fact that these secondary phases are magnetically softer than the spinel phase of ferrite.

Example 2

Influence of the Order of Introduction of the Precursors.

The same method as in Example 1b) above (with prior heating) was carried out with the only difference that the order of introduction of the precursors was different.

This time, the order of introduction of the precursors into the autoclave was RMFB: $PrCl_3$ (R); $CoCl_2 \cdot 6H_2O$ (M); $FeCl_3 \cdot 6H_2O$ (F); NaOH (B).

Figure 3A:
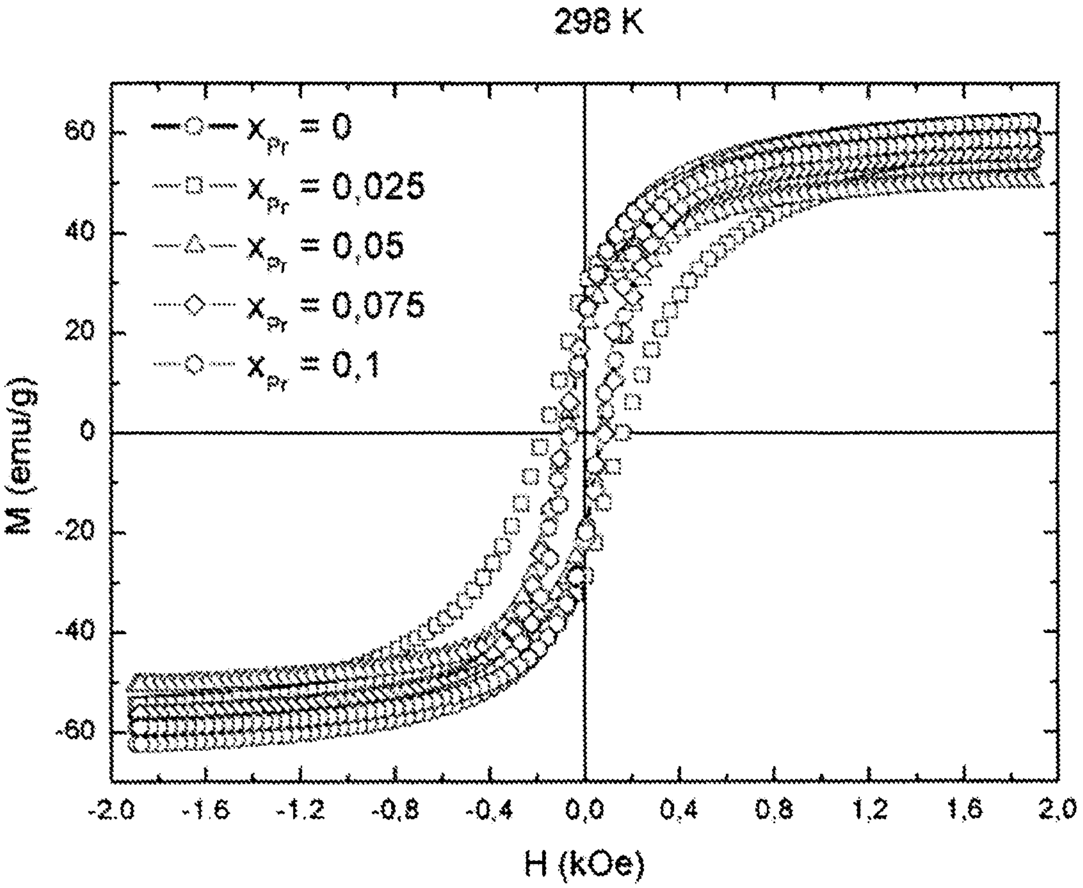
FIG. 3 show hysteresis cycles (FIG. 3*a*) and magnetic induction field versus energy product (BH) curves (FIG. 3*b*) of cobalt ferrites of the composition $MFe_{2-x}R_xO_4$ (M: Co and R: Pr; $0<x<0.1$) synthesized at 145° C. for 2 h, for a basicity level of 7, for an order of introduction of the precursors RMFB into the autoclave, and with prior heating of the precursors.
Figure 3B:
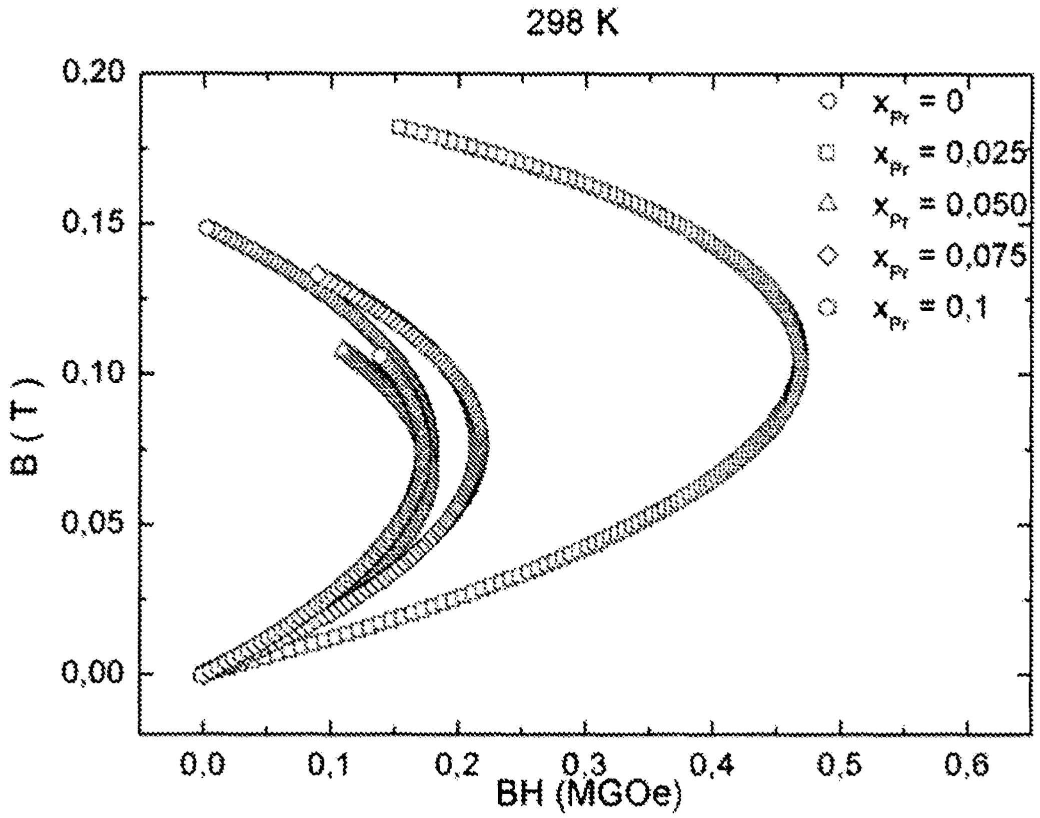

For the magnetic nanoparticles or nanocomposites produced in this way, it is observed that the $H_c$ value of cobalt ferrites obtained after production of $MFe_{2-x}R_xO_4$ composition (M: Co and R: Pr; 0<x<2) is less than 164 mT for x=0.025 (FIG. 3*a*); the value of $(BH)_{max}$ is less than 0.46 MGOe (x=0.025; FIG. 3*b*); and the value of $M_s$ is lower than 63 emu·g$^{-1}$ (x=0.025; FIG. 3*a*).

Under these production conditions, the material is magnetically soft (x=0; x=0.075; x=0.1) or semi-hard (x=0.025; x=0.05). Notable differences may be observed between the coercivity of the nanocomposites in Example 1b) and Example 2 although the only difference is the order of introduction of the precursors.

We can conclude that the order of introduction of the precursors (before starting the hydrothermal/solvothermal production) influences the properties of the ferrites obtained at the end of the production and thus provides a multifunctional production method of magnetic nanocomposites.

Example 3

Influence of the Precursor Concentration.

The same method as in Example 1a) above (without prior heating) was carried out with different concentrations of cobalt chloride.

Figure 5A:
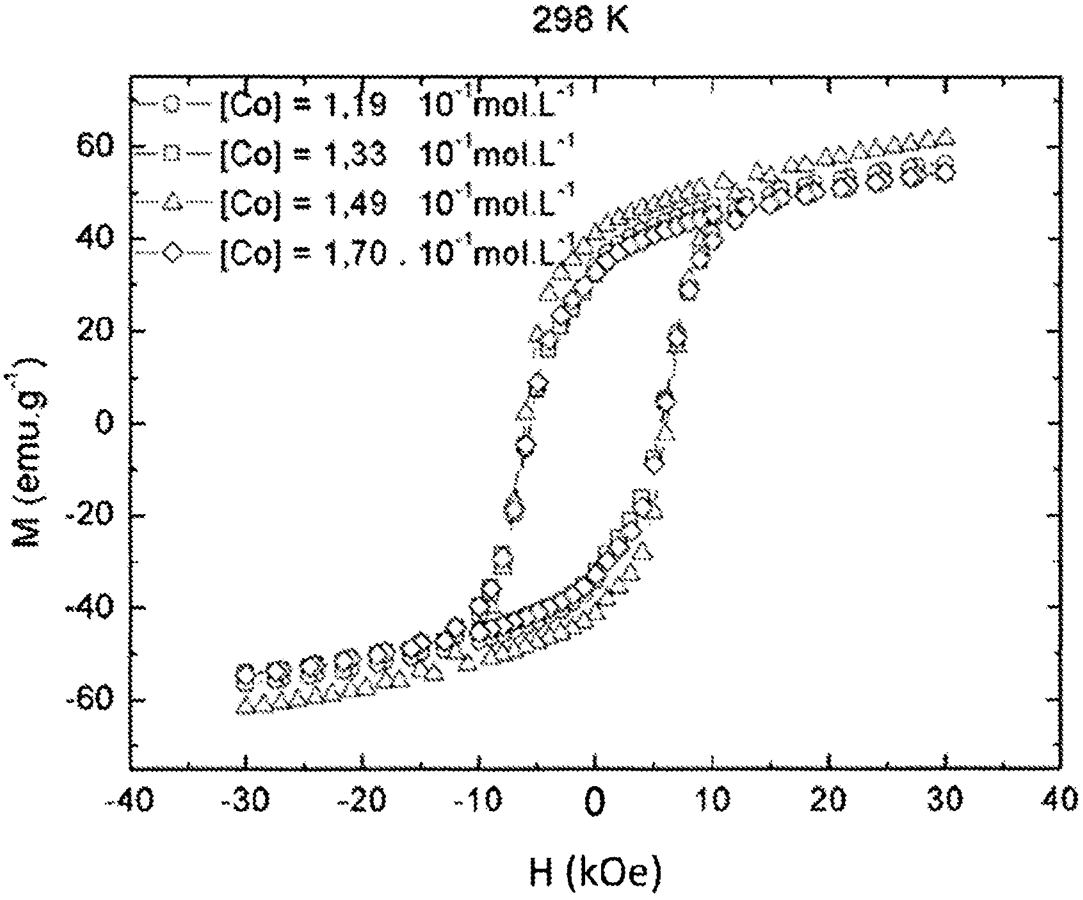
FIG. 5 show hysteresis cycles (FIG. 5*a*) and magnetic induction field versus energy product (BH) curves (FIG. 5*b*) of cobalt ferrites of the composition $MFe_{1.8}R_{0.2}O_4$ (M: Co and R: Pr) for different concentrations of cobalt chloride.
Figure 5B:
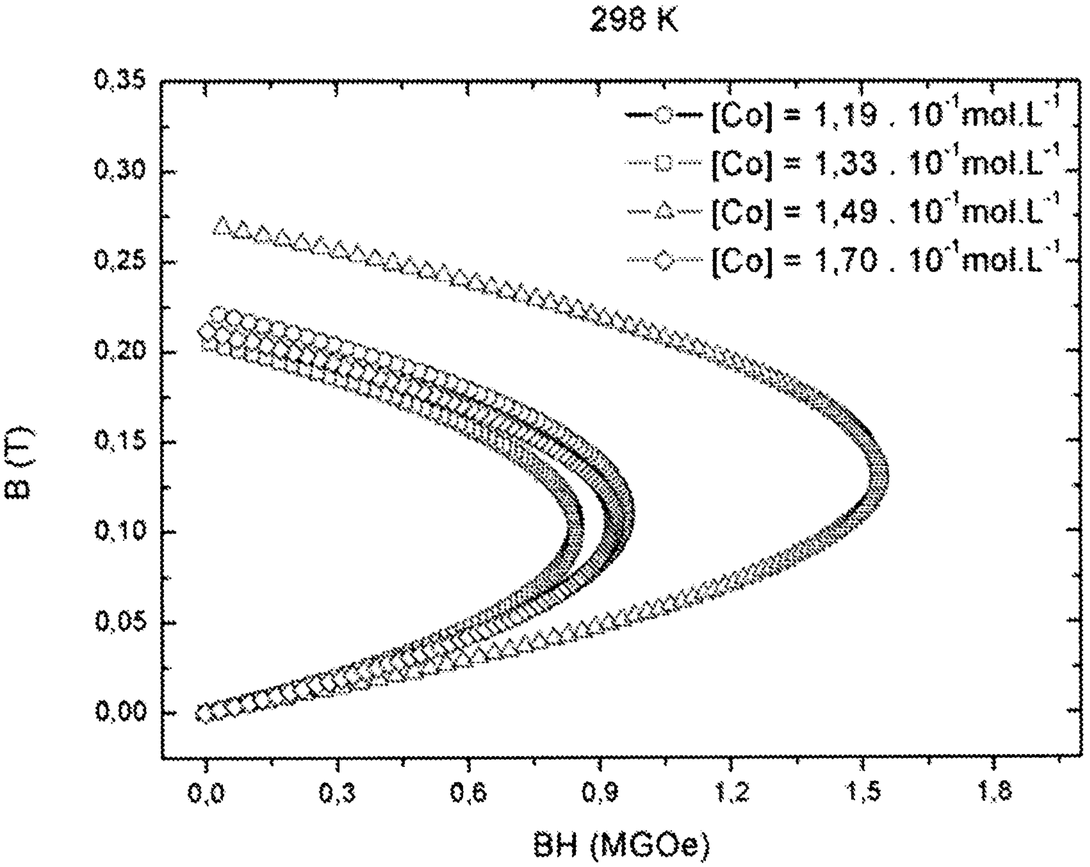

The influence of the cobalt chloride concentration for the $MFe_{1.8}R_{0.2}O_4$ sample (M: Co and R: Pr, FIG. 5*a*) showed that the coercive field is optimal for a concentration of 0.149 mol. L$^{-1}$ of the order of 611 mT. The energy product, $(BH)_{max}$, is 1.54 MGOe (FIG. 5*b*) and the saturation magnetization, $M_s$, is 63.4 emu·g$^{-1}$ (FIG. 5*a*).

The concentration of cobalt chloride therefore also influences the properties of the ferrites obtained at the end of the production method.

Example 4

Influence of the Hydration of at Least One Precursor.

The same method as in Example 1a) above (without prior heating) was carried out with either anhydrous or hydrated iron chloride ($FeCl_3$).

Figure 6A:
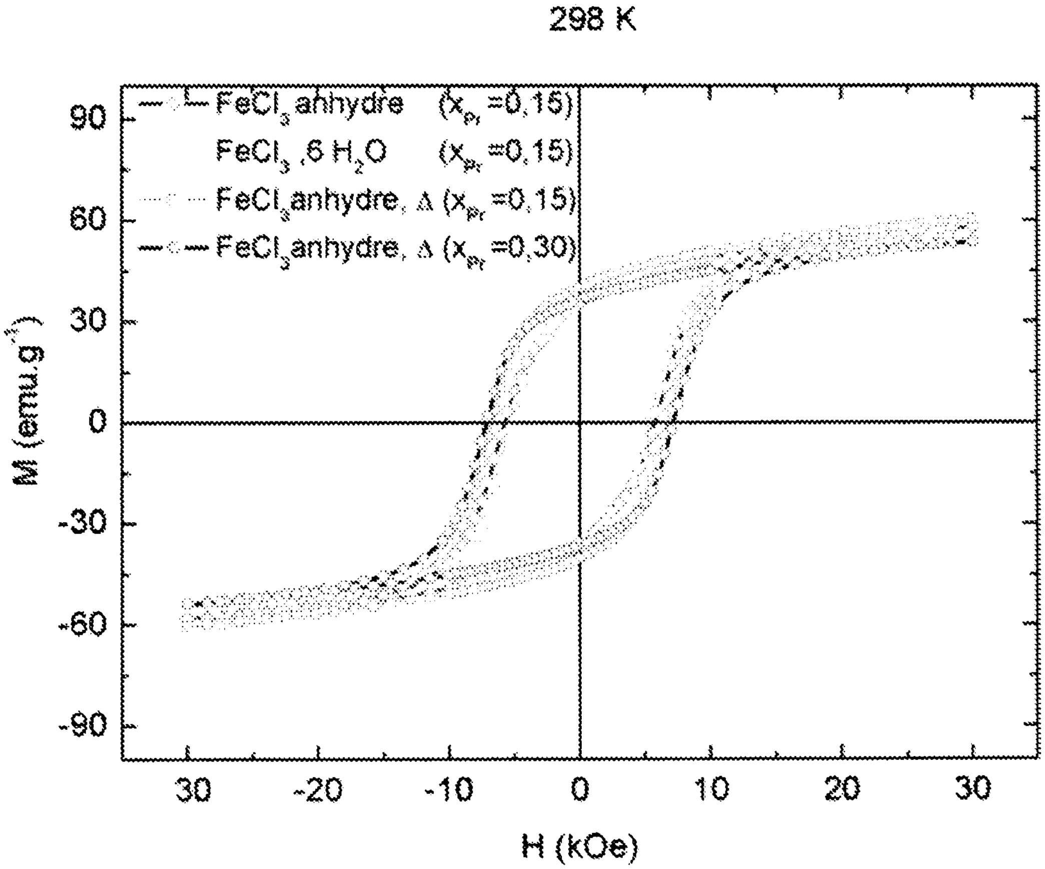
FIG. 6 show hysteresis cycles (FIG. 6*a*) and magnetic induction field versus energy product (BH) curves (FIG. 6*b*) of cobalt ferrite of the composition $MFe_{2-x}R_xO_4$ (M: Co and R: Pr; x=0.15 and x=0.3) for samples with a hydrated or non-hydrated $FeCl_3$ precursor, with or without prior heating of the precursors.
Figure 6B:
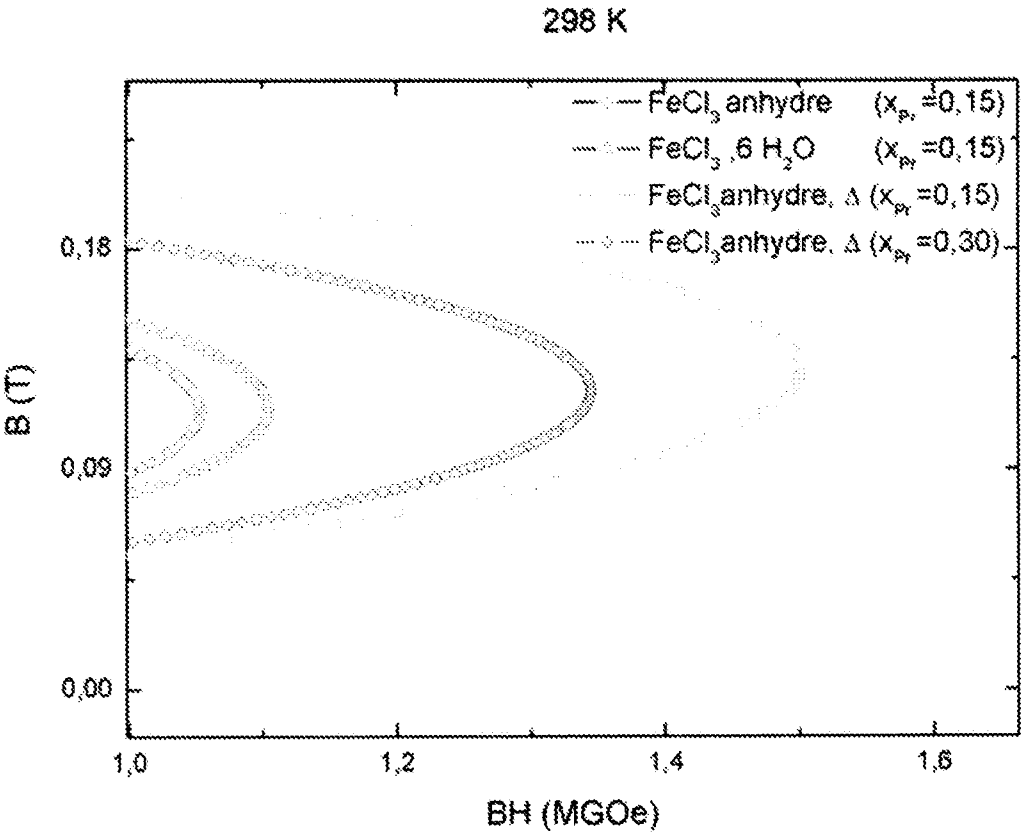

It is observed that the coercive field increases when using anhydrous $PrCl_3$. It goes from 535 mT to 575 mT. The values of the saturation magnetization and the energy product $(BH)_{max}$ remain unchanged and are equal to 60 $emu \cdot g^{-1}$ and 1.1 MGOe, respectively (FIGS. 6*a* and 6*b*).

Whether the precursors are hydrated therefore also influences the properties of the ferrites obtained at the end of the production method.

Example 5

Influence of Prior Heating of the Precursors.

For the same method as Example 4, heating of the precursors prior to production showed an increase in the coercive field to 673 mT, an increase in the energy product $(BH)_{max}$ equal to 1.5 MGOe, as well as an increase in the saturation magnetization to 62 $emu \cdot g^{-1}$ (FIGS. 6*a* and 6*b*).

Preheating the precursors therefore also influences the properties of the ferrites obtained at the end of the production method (see also Example 1).

Example 6

Influence of Rare Earth Precursors.

For the same method as Example 4 and 5, increasing the praseodymium content showed the increase of the coercive field up to 712 mT (FIG. 6*a*) with a decrease of the saturation magnetization and the energy product (BH) max up to 54 $emu \cdot g^{-1}$ (FIG. 6*a*) and 1.35 MGOe (FIG. 6*b*), respectively.

We also conclude substituting cobalt ferrite with praseodymium (Pr) has an influence on the structural and magnetic properties. The substitution of at least one metal precursor (in this case cobalt ferrite) with a rare earth precursor (in this case praseodymium) therefore also influences the properties of the ferrites obtained at the end of the production method.

Example 7

Influence of the Order of Introduction of the Precursors.

Figure 7A:
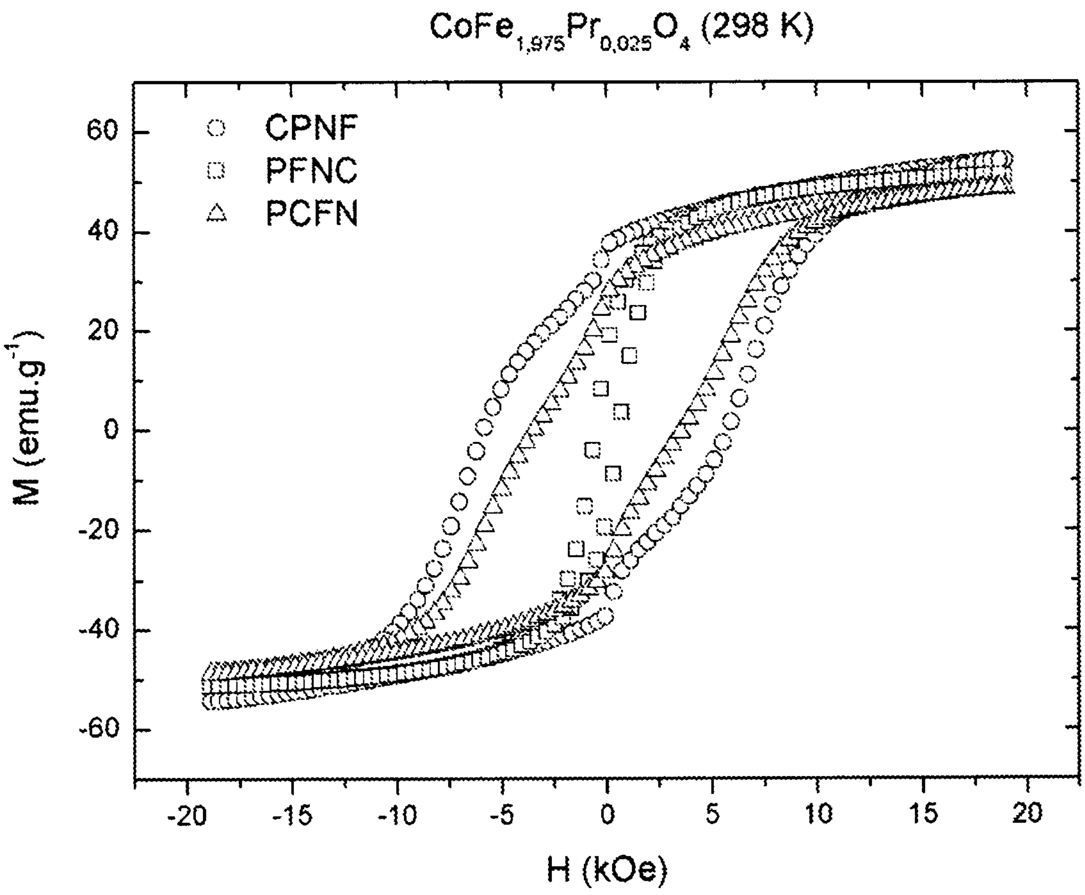
FIG. 7 show the influence of the order of introduction of the precursors on the magnetic properties of the ferrites $MFe_{1.975}R_{0.025}O_4$ (M: CO and R: Pr) and $MFe_{1.925}R_{0.075}O_4$ (M: CO and R: Pr) synthesized at 145° C. for 2 h with prior heating of the precursors. In particular, they show hysteresis cycles (FIG. 7*a*) for three orders MRBF, RFBM, and RMFB and for the composition $MFe_{1.975}R_{0.025}O_4$ (M: Co and R: Pr) and hysteresis cycles (FIG. 7*b*) for the orders MRBF, RMFB, FRBM, BFRM and MBRF with $CoCl_2 \cdot 6H_2O$ (M); $PrCl_3$ (R); NaOH (B); $FeCl_3 \cdot 6H_2O$ (F).
Figure 7B:
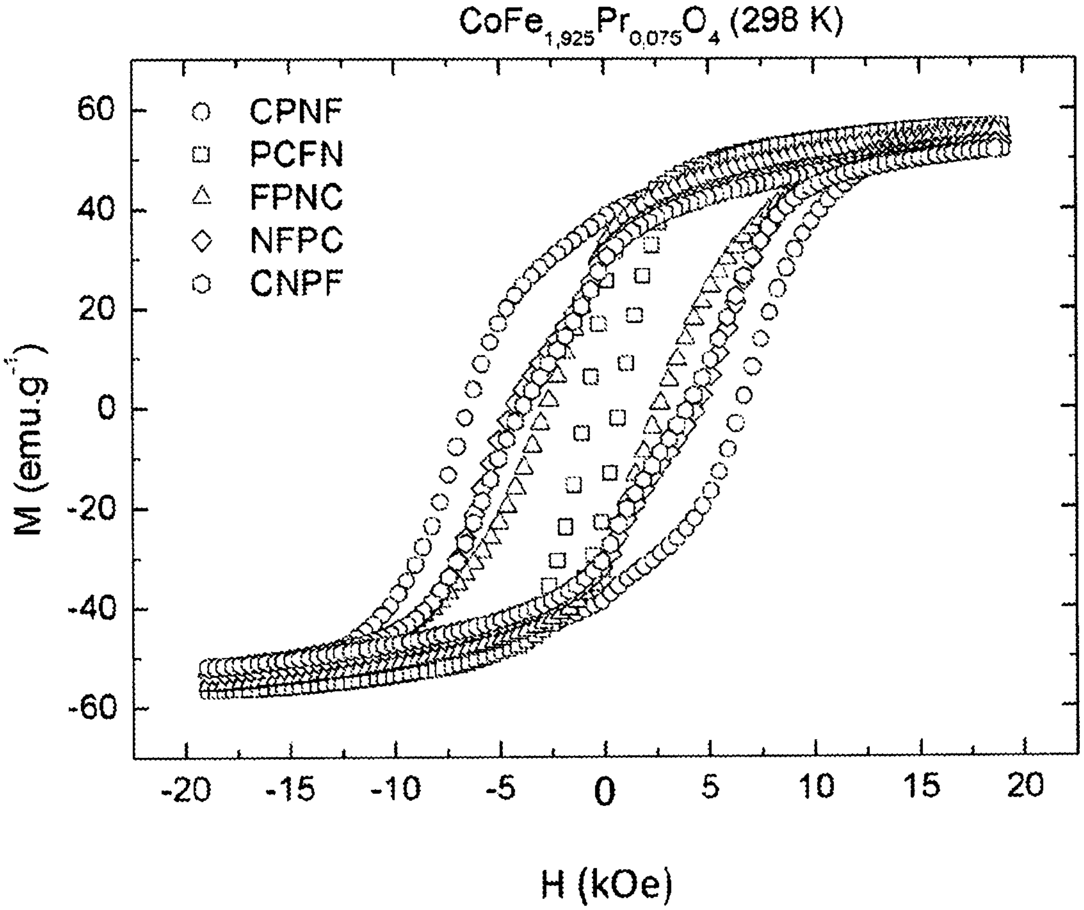

The same method as in Example 1, with prior heating of the precursors and for a Pr substitution ratio equal to 0.025 and 0.075, the study of the influence of the order of introduction of the precursors before hydro (solvothermal) production showed that, for a same composition, the magnet grade of the nanocomposites varies from soft to hard via semi-hard (see FIGS. 7*a* and 7*b*). FIG. 7*a* shows the hysteresis cycles for three orders MRBF, RFBM, and RMFB and for the composition $CoFe_{1.975}Pr_{0.025}O_4$.

Here $PrCl_3$ (R); $CoCl_2 \cdot 6H_2O$ (M); $FeCl_3 \cdot 6H_2O$ (F); NaOH (B).

The three types of magnetic categories can be observed for the different orders:

- MRBF (hard nanocomposites, Hc=5.83 kOe (583 mT)>5 kOe (500 mT);
- RFBM (soft nanocomposites, Hc=0.58 kOe (58 mT)<1 kOe (100 mT);
- and RMFB (semi-hard nanocomposites, 1 kOe (100 mT)<Hc=1.64 kOe (164 mT)<5 kOe (500 mT).

FIG. 7*b* on the right also shows the hysteresis cycles for the orders MRBF, RMFB, FRBM, BFRM, MBRF. By increasing the praseodymium content to xPr=0.075, the magnet grade of a hard magnetic material with Hc=651 mT for the order MRBF and the same category as a soft magnetic material with Hc=85 mT for the RMFB order is obtained.

It can thus be observed that for the same method, the order of introduction of the precursors has a significant influence on the magnetic properties of the nanocomposites produced (see Tables 1 and 2 below).

TABLE 1

| $CoFe_{1.975}Pr_{0.025}O_4$ | | | | |
|---|---|---|---|---|
| Order | $H_c$ (mT) | $M_s$ (emu/g) | $M_r$ (emu/g) | $M_r/M_s$ |
| MRBF | 583 | 54.4 | 36.7 | 0.67 |
| RFBM | 58.1 | 51.3 | 17 | 0.33 |
| RMFB | 164 | 54.4 | 29.2 | 0.54 |

TABLE 2

| $CoFe_{1.925}Pr_{0.075}O_4$ | | | | |
|---|---|---|---|---|
| Order | $H_c$ (mT) | $M_s$ (emu/g) | $M_r$ (emu/g) | $M_r/M_s$ |
| MRBF | 651 | 55.7 | 38.3 | 0.69 |
| RMFB | 85 | 56.6 | 22.3 | 0.39 |
| FRBM | 277 | 55.4 | 33.1 | 0.6 |
| BFRM | 437 | 53.2 | 31.1 | 0.58 |
| MBRF | 398 | 51.9 | 30 | 0.58 |

Example 8

Influence of Rare Earth Precursors.

For the same method as Example 7, increasing the Pr content showed that the substitution of at least one metal precursor (here cobalt ferrite) with a rare earth precursor (here praseodymium) also affects the properties of the ferrites obtained at the end of the production method (see Tables 1 and 2 above)

Other Data

In the context of Example 1a, Table 3 below shows the magnetic properties of cobalt ferrites of the composition $MFe_{2-x}R_xO_4$ (M: Co and R: Pr; 0<x<0.2) synthesized at 145° C. for 2 h, for a basicity level of 7, for a hydrolysis rate greater than 450, for an order of introduction of the precursors MRBF into the autoclave, and without prior heating of the precursors.

TABLE 3

| $x_{Pr}$ | $H_c$ (mT) | $M_s$ ($emu \cdot g^{-1}$) | $M_r$ ($emu \cdot g^{-1}$) | $M_r/M_s$ | $BH_{max}$ (MGOe) |
|---|---|---|---|---|---|
| 0 | 515 | 31.6 | 17.2 | 0.54 | 0.26 |
| 0.05 | 599 | 62.9 | 37.6 | 0.6 | 1.22 |
| 0.1 | 572 | 57.9 | 34.8 | 0.6 | 1.01 |
| 0.15 | 616 | 62.6 | 39.1 | 0.62 | 1.31 |
| 0.2 | 603 | 53.2 | 32.3 | 0.61 | 0.92 |

In the context of Example 2, Table 4 below shows the magnetic properties of cobalt ferrites of the composition $MFe_{2-x}R_xO_4$ (M: Co and R: Pr; 0<x<0.1) synthesized at 145° C. for 2 h, for a basicity level of 7, for a hydrolysis rate greater than 450, for an order of introduction of the precursors RMFB into the autoclave, with prior heating of the precursors.

TABLE 4

| $x_{Pr}$ | $H_c$ (mT) | $M_s$ (emu · $g^{-1}$) | $M_r$ (emu · $g^{-1}$) | $M_r$/ $M_s$ | $(BH)_{max}$ (MGOe) |
|---|---|---|---|---|---|
| 0 | 74.6 | 62.3 | 22 | 0.35 | 0.179 |
| 0.025 | 164 | 54.4 | 29.2 | 0.54 | 0.468 |
| 0.05 | 79.9 | 50.6 | 19.5 | 0.39 | 0.176 |
| 0.075 | 84.8 | 56.6 | 22.3 | 0.39 | 0.216 |
| 0.1 | 63.7 | 59 | 21.4 | 0.36 | 0.173 |

In the context of Example 1b, Table 5 below shows the magnetic properties of cobalt ferrites of the composition $MFe_{2-x}R_xO_4$ (M: Co and R: Pr; 0<x<0.1) synthesized at 145° C. for 2 h, for a basicity level of 7, for a hydrolysis rate greater than 450, for an order of introduction of the precursors MRBF into the autoclave, with prior heating of the precursors.

TABLE 5

| $x_{Pr}$ | $H_c$ (mT) | $M_s$ (emu · $g^{-1}$) | $M_r$ (emu · $g^{-1}$) | $M_r$/ $M_s$ | $(BH)_{max}$ (MGOe) |
|---|---|---|---|---|---|
| 0 | 350 | 48.8 | 27.2 | 0.56 | 0.482 |
| 0.025 | 583 | 54.3 | 36.7 | 0.68 | 0.943 |
| 0.05 | 613 | 54.1 | 36.7 | 0.68 | 1.129 |
| 0.075 | 651 | 55.7 | 38.3 | 0.69 | 1.361 |
| 0.1 | 653 | 52.8 | 36.1 | 0.68 | 1.216 |

In the context of Example 3, Table 6 below shows the magnetic properties of cobalt ferrite of the composition $MFe_{1.8}R_{0.2}O_4$ (M: Co and R: Pr) for different concentrations of cobalt chloride synthesized at 145° C. for 2 h, for a basicity level of 7, for a hydrolysis rate greater than 450, and for an order of introduction of the precursors MRBF into the autoclave.

TABLE 6

| [Co] (mol · $L^{-1}$) | $H_c$ (mT) | $M_s$ (emu · $g^{-1}$) | $M_r$ (emu · $g^{-1}$) | $M_r$/ $M_s$ | $(BH)_{max}$ (MGOe) |
|---|---|---|---|---|---|
| 0.119 | 561 | 58.1 | 34.2 | 0.59 | 0.962 |
| 0.133 | 565 | 56 | 32.2 | 0.58 | 0.847 |
| 0.149 | 611 | 63.4 | 41.2 | 0.65 | 1.538 |
| 0.17 | 568 | 56.2 | 33 | 0.59 | 0.935 |

In the context of Example 4, Table 7 below shows the magnetic properties of cobalt ferrite of the composition $MFe_{2-x}R_xO_4$ (M: Co and R: Pr; x=0.15 and x=0.3) for samples with a hydrated or non-hydrated $FeCl_3$ precursor, with or without prior heating of the precursors, synthesized at 145° C. for 2 h, for a basicity level of 7, for a hydrolysis rate greater than 450, and for an order of introduction of the precursors MRBF into the autoclave.

TABLE 7

| Samples | $H_c$ (mT) | $M_s$ (emu · $g^{-1}$) | $M_r$ (emu · $g^{-1}$) | $M_r$/ $M_s$ | $(BH)_{max}$ (MGOe) |
|---|---|---|---|---|---|
| Anhydrous $FeCl_3$ ($x_{Pr}$ = 0.15) | 575 | 59.6 | 35.8 | 0.6 | 1.053 |
| $FeCl_3$, $6H_2O$ ($x_{Pr}$ = 0.15) | 535 | 60.2 | 35.9 | 0.6 | 1.104 |
| Anhydrous $FeCl_3$, D ($x_{Pr}$ = 0.15) | 673 | 62 | 40.3 | 0.65 | 1.501 |
| Anhydrous $FeCl_3$, D ($x_{Pr}$ = 0.30) | 712 | 54 | 36.4 | 0.67 | 1.35 |

The invention claimed is:

1. A method for producing iron oxide-based magnetic nanocomposites, said magnetic nanocomposites having a given magnet grade, said method comprising the following steps:

a0) separate dissolutions of:

an iron-based precursor (F) in a first solvent in a first container, at least one metal precursor (M) other than an iron-based precursor in a second solvent in a second container, at least one base (B) in a third solvent in a third container;

a) combining at room temperature of the dissolved iron-based precursor (F) and of the at least one metal precursor (M) other than a dissolved iron-based precursor, of at the least one dissolved base (B), and optionally of at least one dissolved rare earth precursor (R), in a given order of introduction into an autoclave, the combination of said dissolved precursors with the base (B) resulting in co-precipitation of said precursors, the order of introduction of the dissolved at least one base (B) into the autoclave in relation to the introductions of the dissolved precursors allowing different precipitates to be obtained, wherein the given order of introduction, in step a), of the solutions of step a0) into the autoclave is selected from:

when the dissolved precursors do not include a rare earth precursor (R), one of the following orders of introduction: MBF, MFB, FMB, FBM, BMF, or BFM;

or when at least one dissolved rare earth precursor (R) is generated in step a0), one of the following orders of introduction:

MRFB, MRBF, MFRB, MFBR, MBFR, MBRF, RMFB, RMBF, RFMB, RFBM, RBFM, RBMF, BRFM, BRMF, BFMR, BFRM, BMFR, BMRF, FRBM, FRMB, FMRB, FMBR, FBRM, or FBMR;

wherein:

F is the iron-based precursor;

M is the at least one metal precursor other than an iron-based precursor, and M is selected from metal chlorides, metal nitrates, metal acetates, metal sulfates, and/or from cobalt-, nickel-, zinc-, and/or copper-based precursors;

B is the at least one base;

R is the at least one rare earth precursor;

b) hydrothermal and/or solvothermal production;

carried out at a basicity level up to 100, wherein the basicity level b corresponds to $$b = \frac{n_B}{\sum n_{M'}} = \frac{[B]}{\sum [M']},$$

b: base and M'=M and R; so as to obtain magnetic nanocomposites which have a main phase and one or more secondary phases $M'_2(OH)_2O_2$ and/or $R(OH)_3$, said magnetic nanocomposites having a given magnet grade which is a function of the given order of introduction of the dissolved precursors in relation to the at least one dissolved base B in step a), with M'=Fe or M; and wherein the main phase is a spinel ferrite of empirical formula $Co_xNi_yZn_zCu_uMn_vAg_tFe_{2-w}R_wO_4$, with $$x+y+z+u+v+t=1$$

R being selected from: La, Ce, Pr, Nd, Pm, Sm, Eu, Gd, Tb, Dy, Ho, Er, Tm, Yb, and Lu; and w between 0 and 2; and c) a step of washing the magnetic nanocomposites.

2. The production method according to claim 1, wherein the method does not include a step of calcining the magnetic nanocomposites.

3. The production method according to claim 1, wherein in step a0) the containers are heated to a given temperature below the boiling point of the respective solvent, and then allowed to cool down to room temperature before step a) is carried out.

4. The production method according to claim 1, wherein the magnetic nanocomposites have from 85% to 97% of said main phase and from 15% to 3% of at least one said secondary phase, respectively.

5. The production method according to claim 1, wherein the hydrothermal and/or solvothermal production is carried out at a basicity level between 5 and 25.

6. The production method according to claim 1, wherein the iron-based precursor (F) and/or the at least one metal precursor (M) other than the iron-based precursor is/are used in its/their anhydrous form.

7. The production method according to claim 1, wherein the at least one rare earth precursor (R) is/are selected from rare earth chlorides, rare earth nitrates, rare earth acetates, rare earth sulfates, and/or from lanthanum, cerium, praseodymium, neodymium, promethium, samarium, europium, gadolinium, terbium, dysprosium, holmium, erbium, thulium, ytterbium, lutetium, scandium, and yttrium.

8. The production method according to claim 1, wherein different concentrations of the precursors are used in step a0) to modulate the magnet grade of the magnetic nanocomposites, where the magnet grade of the magnetic nanocomposites corresponds to: soft magnetic material, or semi-hard magnetic material, or hard magnetic material.

9. The production method according to claim 1, the given magnet grade being selected from soft magnetic material, semi-hard magnetic material, or hard magnetic material.

10. The production method according to claim 1, wherein the first solvent is an aqueous and/or organic solvent.

11. A method for producing iron oxide-based magnetic nanocomposites, said magnetic nanocomposites having a given magnet grade, said method comprising the following steps:

a0) separate dissolutions of:

an iron-based precursor (F) in a first solvent in a first container, at least one metal precursor (M) other than an iron-based precursor in a second solvent in a second container, a rare earth precursor (R), a base (B) in a third solvent in a third container;

a) combining at room temperature of the dissolved iron-based precursor (F) and of the metal precursor (M) other than a dissolved iron-based precursor, of the dissolved base (B), and the dissolved rare earth precursor (R), in a given order of introduction into an autoclave, the combination of said dissolved precursors with the base (B) resulting in co-precipitation of said precursors, the order of introduction of the dissolved base (B) into the autoclave in relation to the introductions of the dissolved precursors allowing different precipitates to be obtained, wherein the given order of introduction, in step a), of the solutions of step a0) into the autoclave comprises:

one of the following orders of introduction:

MRFB, MRBF, MFRB, MFBR, MBFR, MBRF, RMFB, RMBF, RFMB, RFBM, RBFM, RBMF, BRFM, BRMF, BFMR, BFRM, BMFR, BMRF, FRBM, FRMB, FMRB, FMBR, FBRM, or FBMR;

wherein:

F is the iron-based precursor;

M is the metal precursor other than an iron-based precursor, and M is selected from metal chlorides, metal nitrates, metal acetates, metal sulfates, and/or from cobalt-, nickel-, zinc-, and/or copper-based precursors;

B is the base;

R is the rare earth precursor;

b) hydrothermal and/or solvothermal production being carried out at a basicity level up to 100, wherein the basicity level b corresponds to $$b=\frac{n_B}{\sum n_{M'}}=\frac{[B]}{\sum [M']},$$

b: base and M'=M and R, so as to obtain magnetic nanocomposites which have a main phase and one or more secondary phases $M'_2(OH)_2O_2$ and/or $R(OH)_3$, said magnetic nanocomposites having a given magnet grade which is a function of the given order of introduction of the dissolved precursors in relation to the dissolved base B in step a), with M'=Fe or M; and wherein the main phase is a spinel ferrite of empirical formula $Co_xNi_yZn_zCu_uMn_vAg_tFe_{2-w}R_wO_4$, with $$x+y+z+u+v+t=1$$

R being selected from: La, Ce, Pr, Nd, Pm, Sm, Eu, Gd, Tb, Dy, Ho, Er, Tm, Yb, and Lu; and w between 0 and 2; and c) a step of washing the magnetic nanocomposites.

12. The method according to claim 11, wherein the method does not include a step of calcining the magnetic nanocomposites.

13. The method according to claim 11, wherein in step a0) the containers are heated to a given temperature below the boiling point of the respective solvent, and then allowed to cool down to room temperature before step a) is carried out.

14. The method according to claim 11, wherein the magnetic nanocomposites have from 85% to 97% of said main phase and from 15% to 3% of at least one secondary phase, respectively.

15. The method according to claim 11, wherein the hydrothermal and/or solvothermal production is carried out at a basicity level between 5 and 25.

16. The method according to claim 11, wherein the iron-based precursor and/or the metal precursor other than the iron-based precursor is/are used in its/their anhydrous form.

17. The method according to claim 11, wherein the rare earth precursor (R) is selected from rare earth chlorides, rare earth nitrates, rare earth acetates, rare earth sulfates, and/or from lanthanum, cerium, praseodymium, neodymium, promethium, samarium, europium, gadolinium, terbium, dysprosium, holmium, erbium, thulium, ytterbium, lutetium, scandium, yttrium, and/or from combinations thereof.

18. The method according to claim 11, wherein different concentrations of the precursors are used in step a0) to modulate the magnet grade of the magnetic nanocomposites, where the magnet grade of the magnetic nanocomposites corresponds to: soft magnetic material, or semi-hard magnetic material, or hard magnetic material.

19. The method according to claim 1, wherein hydrothermal and/or solvothermal production is carried out at 145° C. for 2 hours.

20. The method according to claim 11, wherein hydrothermal and/or solvothermal production is carried out at 145° C. for 2 hours.

* * * * *